(12) United States Patent
Hatayama

(10) Patent No.: US 11,971,843 B2
(45) Date of Patent: Apr. 30, 2024

(54) DATA PROCESSING APPARATUS AND METHOD, RECORDING MEDIUM, AND METHOD FOR DATA PROCESSING SYSTEM

(71) Applicant: CASIO COMPUTER CO., LTD., Tokyo (JP)

(72) Inventor: Takashi Hatayama, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1042 days.

(21) Appl. No.: 16/570,557

(22) Filed: Sep. 13, 2019

(65) Prior Publication Data

US 2020/0089646 A1   Mar. 19, 2020

(30) Foreign Application Priority Data

Sep. 18, 2018 (JP) .................................. 2018-174130
Sep. 6, 2019 (JP) .................................. 2019-163224

(51) Int. Cl.
*G06F 15/02* (2006.01)
*G09B 5/02* (2006.01)

(52) U.S. Cl.
CPC ...... *G06F 15/0225* (2013.01); *G06F 15/0208* (2013.01); *G06F 15/0275* (2013.01); *G06F 15/0283* (2013.01); *G09B 5/02* (2013.01)

(58) Field of Classification Search
CPC ............. G06F 15/0225; G06F 15/0208; G06F 15/0275; G06F 15/0283; G09B 5/02
(Continued)

(56) References Cited

U.S. PATENT DOCUMENTS 8,923,994 B2 * 12/2014 Laikari ................ A61B 5/1123
700/91
2010/0198903 A1   8/2010 Brady et al.
(Continued)

FOREIGN PATENT DOCUMENTS

CN          101458739 A    6/2009
EP          2 860 596 A2   4/2015
(Continued)

OTHER PUBLICATIONS

Extended European Search Report dated Jan. 24, 2020 in European Patent Application No. 19 19 7460.9.
(Continued)

*Primary Examiner* — Hosain T Alam
*Assistant Examiner* — Nicholas E Allen
(74) *Attorney, Agent, or Firm* — Scully, Scott, Murphy & Presser, P.C.

(57) ABSTRACT

There is provided a data processing apparatus including a processor, the processor is configured to: receive one or more sets of data output from at least one data output apparatus via a communication network, each set of the data including sensor data obtained by at least one sensor and first specifying information that specifies the data processing apparatus; determine whether or not the first specifying information included in the received one or more sets of data satisfies a predetermined condition; classify the one or more sets of data determined to satisfy the condition into a same group; and generate and output an output file based on the one or more sets of data classified into the same group.

12 Claims, 17 Drawing Sheets

(58) Field of Classification Search
USPC .......................................................... 708/160
See application file for complete search history.

(56) References Cited

U.S. PATENT DOCUMENTS

| | | |
|---|---|---|
| 2014/0267753 A1 | 9/2014 | Epperson et al. |
| 2014/0313303 A1* | 10/2014 | Davis ........................ A61B 5/68 |
| | | 348/77 |
| 2015/0347680 A1* | 12/2015 | Doetsch ............. G01N 33/6887 |
| | | 702/19 |
| 2016/0063873 A1* | 3/2016 | Zimmer .................. G06Q 50/20 |
| | | 434/353 |
| 2016/0080667 A1 | 3/2016 | Stuart et al. |
| 2017/0357694 A1* | 12/2017 | Watanabe ......... G06F 16/24568 |
| 2018/0077092 A1* | 3/2018 | Jalil ..................... G06Q 10/101 |
| 2018/0114377 A1* | 4/2018 | Dyeyev .................. G06Q 10/20 |
| 2018/0231946 A1* | 8/2018 | Savo ..................... G05B 19/042 |

FOREIGN PATENT DOCUMENTS

| | | |
|---|---|---|
| JP | 2003-281671 A | 10/2003 |
| JP | 2004-354725 A | 12/2004 |
| JP | 2017-015825 A | 1/2017 |
| JP | 6168108 B2 | 7/2017 |
| JP | 2017-182840 A | 10/2017 |
| JP | 2018-028800 A | 2/2018 |
| JP | 2019-008512 A | 1/2019 |
| JP | 2019-061390 A | 4/2019 |
| WO | 2017/165421 A1 | 9/2017 |

OTHER PUBLICATIONS

Notification of First Office Action dated Feb. 25, 2023 received in Chinese Patent Application No. CN 201910863193.6.

\* cited by examiner

| Sensor information | Time range | Network identification information ||
| --- | --- | --- | --- |
| | | Teacher terminal ID | Network ID |
| Current or voltage | hh1:mm1~hh1:mm1 | A | D |
| Current | hh2:mm2~hh2:mm2 | A | D' |
| Current | hh3:mm3~hh3:mm3 | A | D" |
| Voltage | hh4:mm4~hh4:mm4 | A | D" |
| Current | hh4:mm4~hh4:mm4 | A' | E |
| Voltage | hh1:mm1~hh1:mm1 | A' | E' |
| Voltage | hh5:mm5~hh5:mm5 | A" | D |
| Resistance | hh1:mm1~hh1:mm1 | A" | F |
| Resistance | hh6:mm6~hh6:mm6 | A" | F |

Rows 1–4: Teacher A; rows 5–6: Teacher A'; rows 7–9: Teacher A"

FIG. 4

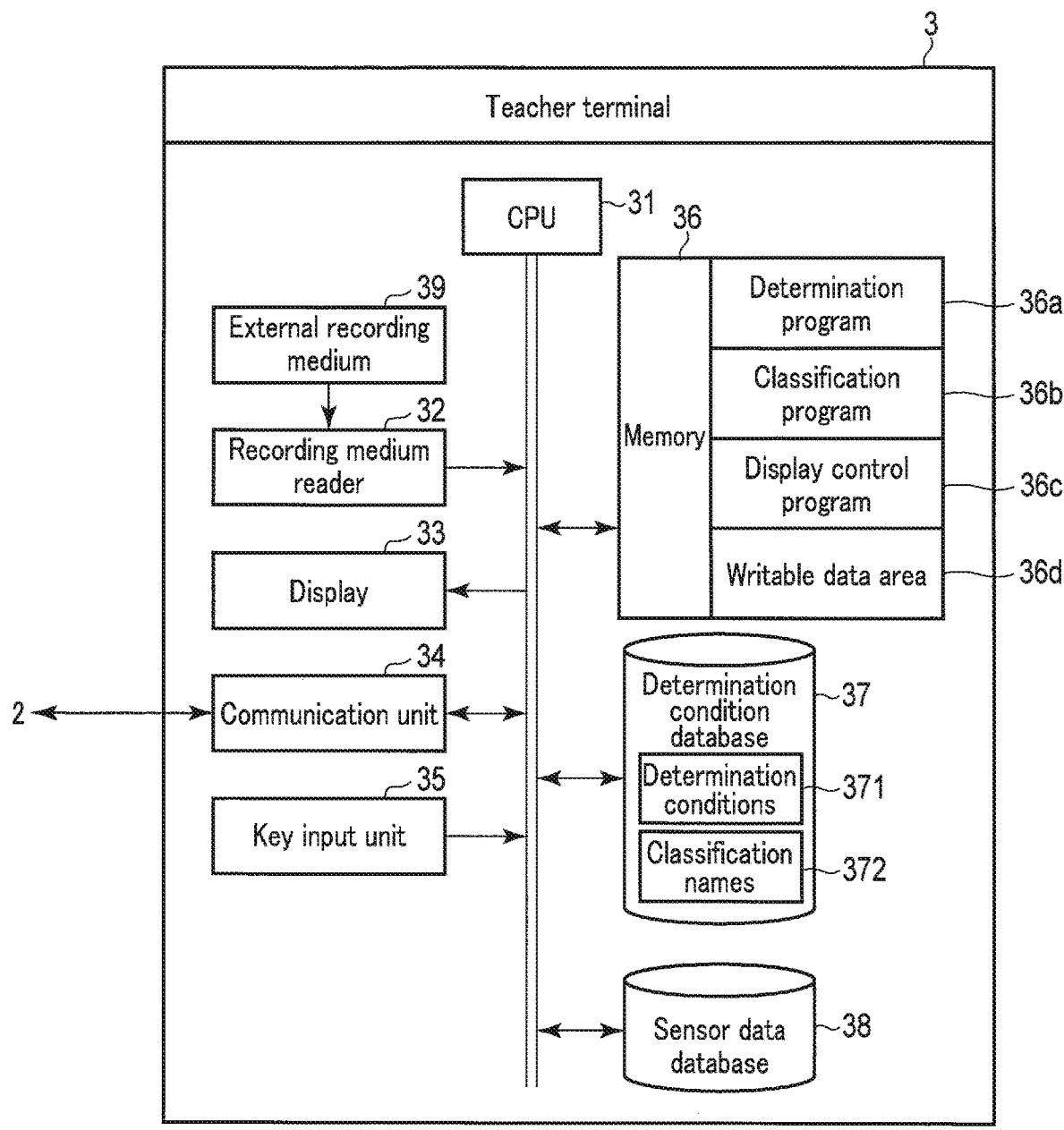
F I G. 5

| Sensor information | Time range | Teacher terminal ID | Network ID | Group ID |
|---|---|---|---|---|
| Current | hh1:mm1~hh1:mm1 | A | D | W |
| Current | hh2:mm2~hh2:mm2 | A | D' | X |
| Current | hh3:mm3~hh3:mm3 | A | D'' | Y |
| Voltage | hh4:mm4~hh4:mm4 | A | D''' | Z |

Determination conditions 371 | Classification names 372

F I G. 6

| Sensor data ID | Class ID |
|---|---|
| Student a | B |
| Student b | B |
| Student c | B' |
| Student d | B" |
| Student e | B |
| Student f | B"' |
| ⋮ | ⋮ |

FIG. 7

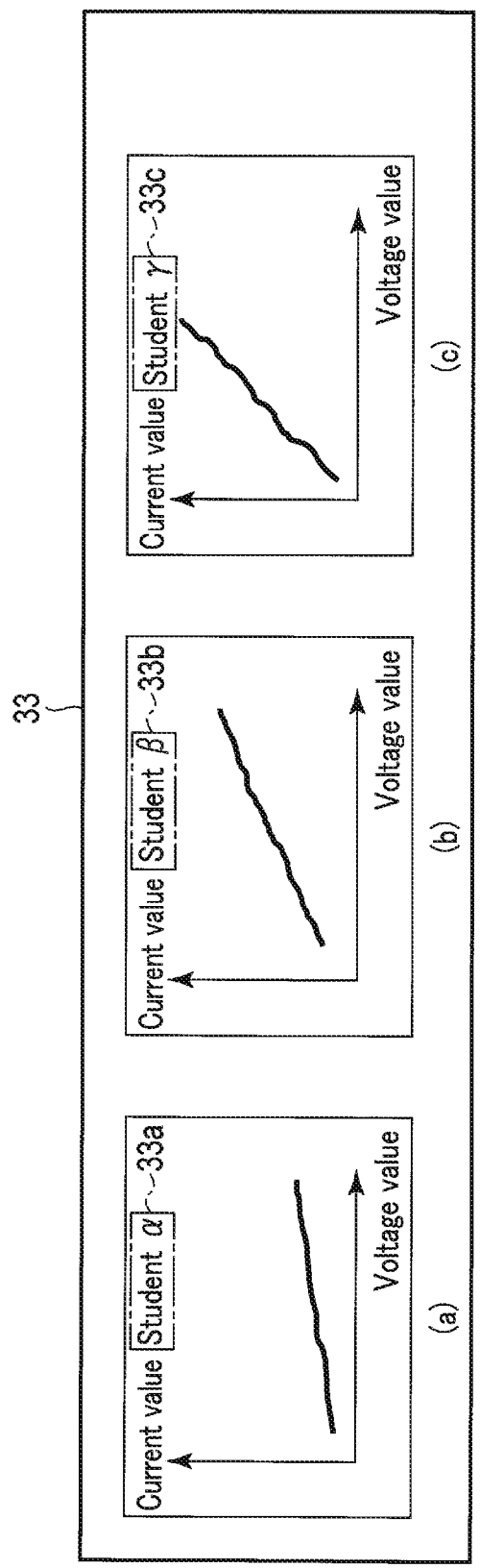
F I G. 8

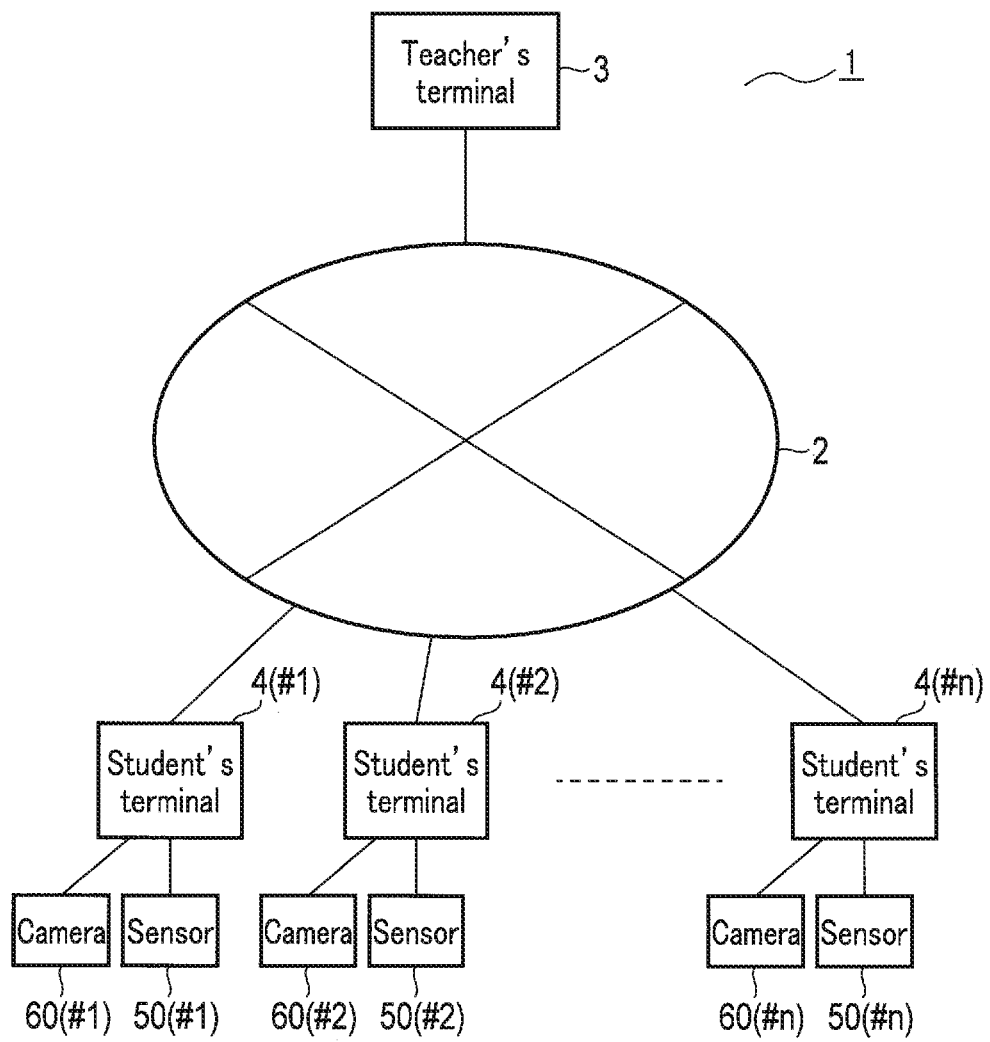
F I G. 11

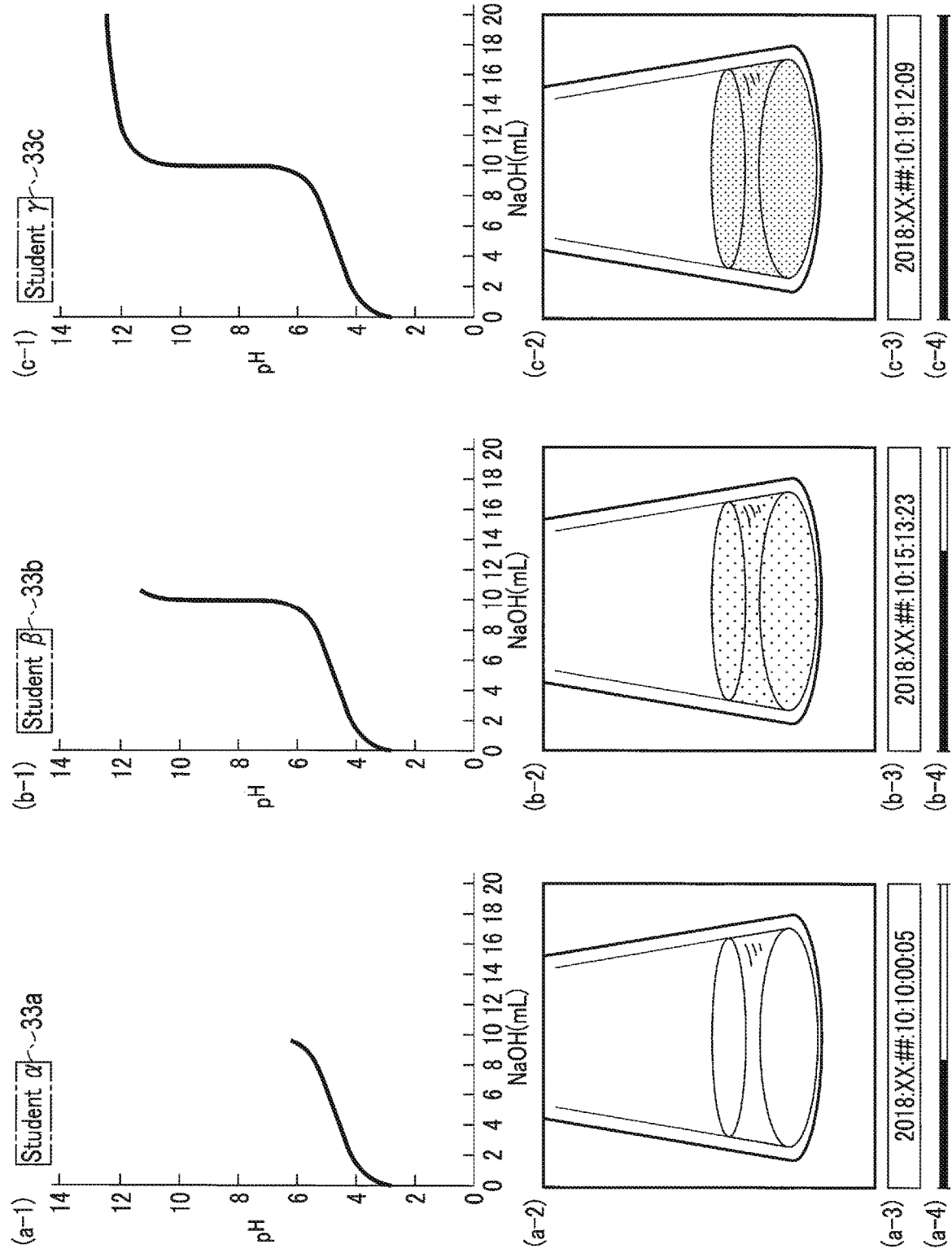
F I G. 13

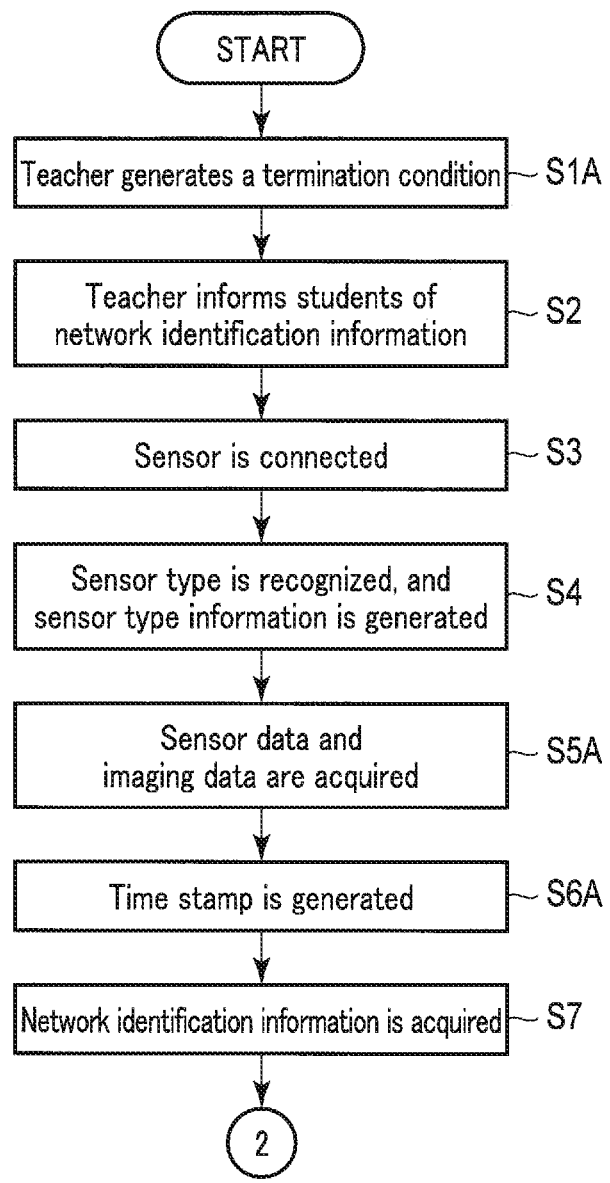
F I G. 14A

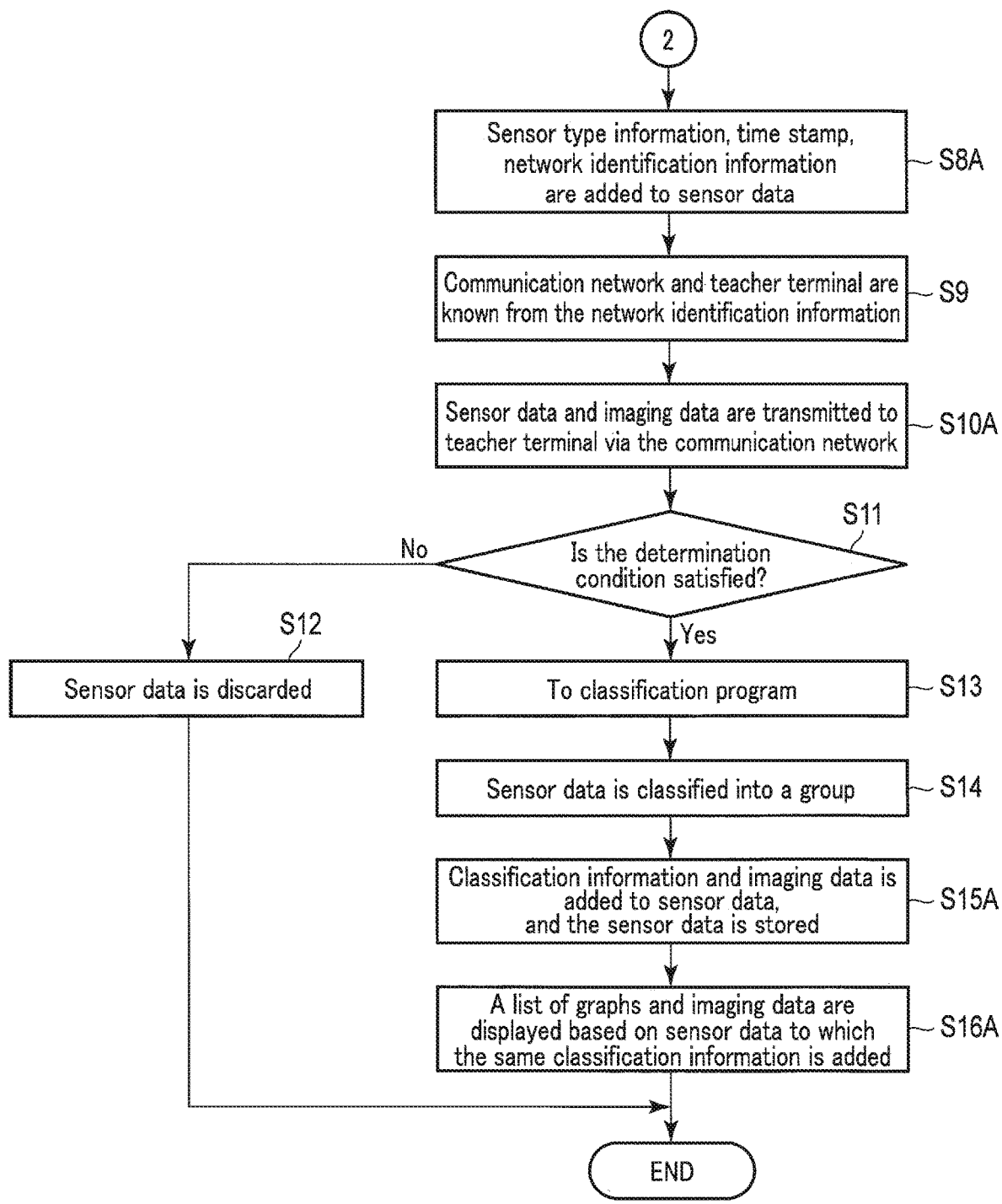
F I G. 14B

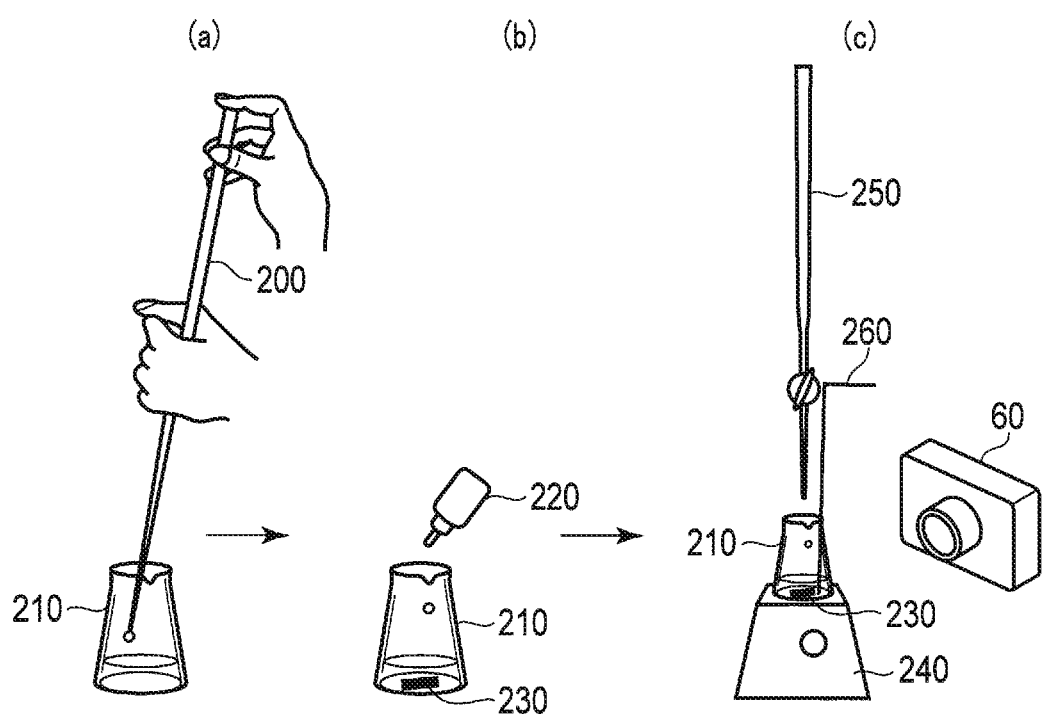
F I G. 15

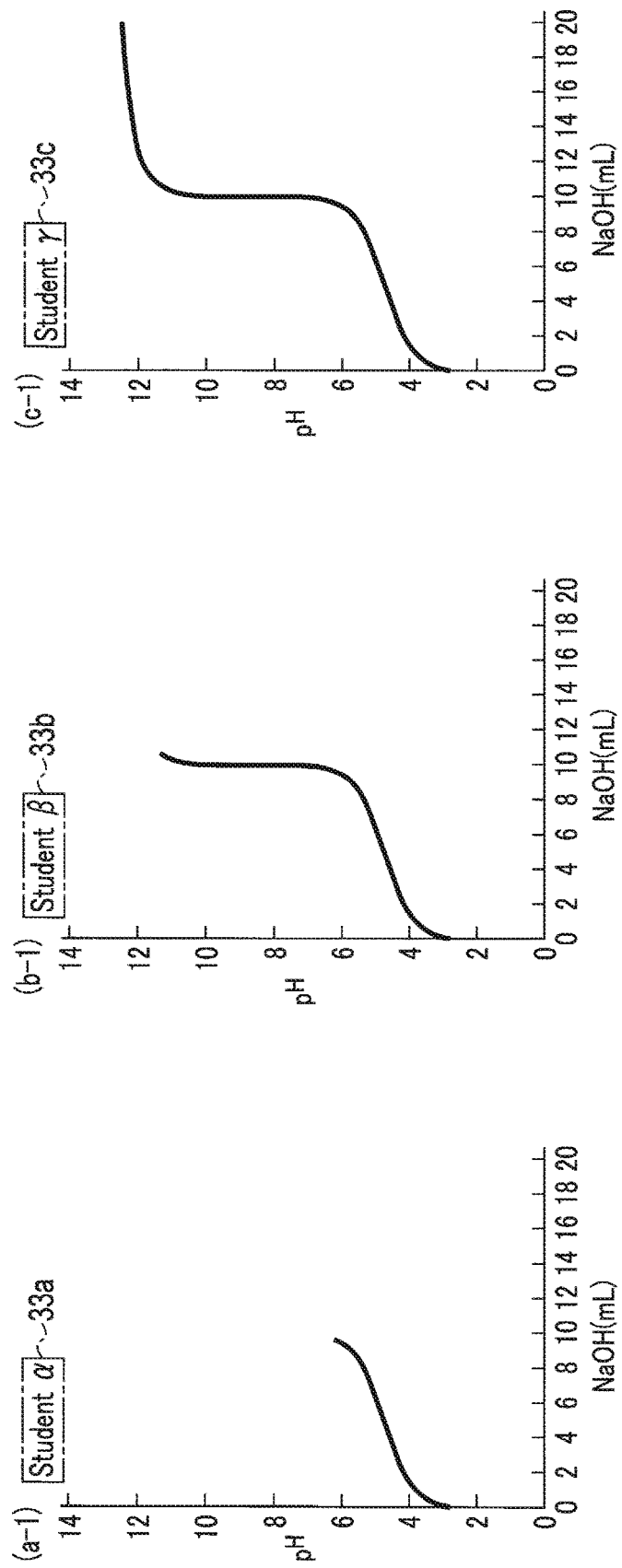
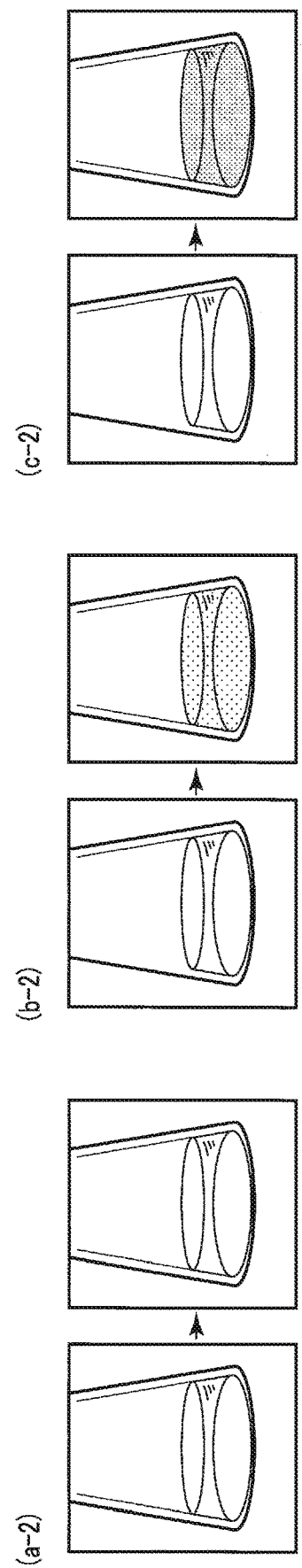
FIG. 16

DATA PROCESSING APPARATUS AND METHOD, RECORDING MEDIUM, AND METHOD FOR DATA PROCESSING SYSTEM

CROSS-REFERENCE TO RELATED APPLICATIONS

This application is based upon and claims the benefit of priority from prior Japanese Patent Applications No. 2018-174130, filed Sep. 18, 2018, and No. 2019-163224, filed Sep. 6, 2019, the entire contents of which are incorporated herein by reference.

TECHNICAL FIELD

The technical field relates to a data processing apparatus and method, recording medium, and a method for data processing system for displaying at once, for example, a plurality of data items obtained separately by a plurality of sensors.

DESCRIPTION OF RELATED ART

A graphing scientific calculator is a calculator capable of drawing graphs, calculating simultaneous equations, and performing calculation using variables. This type of graphing scientific calculator has a display for displaying a few lines of text or a graph of a calculation result. A graphing scientific calculator is thus provided with a calculation function and a display function.

In addition to such functions, a graphing scientific calculator having a function for direct or indirect connection to a sensor has been manufactured in recent years. With this type of graphing scientific calculator, when, for example, a sensor-connected data logger is connected, sensor data detected by the sensor can be acquired after the necessary settings are made.

In more recent years, in order to simplify the necessary settings, a measurement application that automatically performs the settings once the calculator is connected to a sensor-connected data logger has been developed. For example, Jpn. Pat. Appln. KOKAI Publication No. 2003-281671 discloses a data logger capable of controlling automatic measurement, and reading, editing, and transmitting measurement conditions.

With the measurement application, not only the sensor data detected by the sensor is acquired but also a sensor type is automatically recognized.

It is assumed that a graphing scientific calculator in which such a measurement application is installed is used in an educational setting, such as scientific experiments.

In a scientific experiment, a teacher checks if the experiment has been appropriately conducted by each student or group of students through receiving, with his or her own device, sensor data acquired during the experiment, which is transmitted from each student or each group of students, and then checking a result of the experiment. Furthermore, a teacher causes the display of the student terminals to display a list of the experiment results from each student (or some of the students who participate in the experiment) or each group, in a form of graphs generated from sensor data, for example. It is thereby possible for the students who participate in the experiment to check or compare the experiment results acquired by other students or groups.

To deliver such an efficient class, each student or a representative of each group acquires sensor data detected by the sensor, and transmits the acquired sensor data to the teacher terminal with the use of a graphic scientific calculator in which an application such as the aforementioned is installed.

Such transmission of sensor data from the graphic scientific calculator can be directly made to the teacher terminal, if the graphing scientific calculator is provided with a communication function.

If, on the other hand, the graphing scientific calculator does not have a communication function, as long as the calculator has an online sharing function, the transmission of sensor data can be achieved by generating a QR code (registered trademark) corresponding to the sensor data, reading the QR code by a smart phone or a tablet device, and transmitting the sensor data to a teacher terminal from the calculator itself as a proxy.

BRIEF SUMMARY

According to one aspect of the invention, there is provided a data processing apparatus including a processor, the processor is configured to: receive one or more sets of data output from at least one data output apparatus via a communication network, each set of the data including sensor data obtained by at least one sensor and first specifying information that specifies the data processing apparatus; determine whether or not the first specifying information included in the received one or more sets of data satisfies a predetermined condition; classify the one or more sets of data determined to satisfy the condition into a same group; and generate and output an output file based on the one or more sets of data classified into the same group.

According to another aspect of the invention, there is provided a data processing method performed by a processor of a data processing apparatus, the method includes: receiving one or more sets of data output from at least one data output apparatus via a communication network, each set of the data including sensor data obtained by at least one sensor and first specifying information that specifies the data processing apparatus; determining whether or not the first specifying information included in the received one or more sets of data satisfies a predetermined condition; classifying the one or more sets of data determined to satisfy the condition into a same group; and generating and outputting an output file based on the one or more sets of data classified into the same group.

According to another aspect of the invention, there is provided a non-transitory computer-readable recording medium with an executable program stored thereon, wherein the program instructs a controller of a data processing apparatus to perform: receiving one or more sets of data output from each of a plurality of information processing terminal via a communication network, the data processing apparatus and the plurality of information processing terminal being communicably connected to the data processing apparatus via the communication network, each set of the data including sensor data obtained by at least one sensor and first specifying information that specifies the data processing apparatus; determining whether or not the first specifying information included in the received one or more sets of data satisfies a predetermined condition; classifying the one or more sets of data determined to satisfy the condition into a same group; and generating and outputting an output file based on the one or more sets of data classified into the same group.

According to another aspect of the invention, there is provided a method performed by a data processing system that includes a data processing apparatus, and a plurality of information processing terminals being communicably connected to the data processing apparatus via a communication network, the method includes: each controller of the information processing terminals: transmitting one or more sets of data via the communication network, each set of the data including sensor data acquired by at least one sensor and first specifying information that specifies the data processing apparatus; a controller of the data processing apparatus: receiving the one or more sets of data output from each of the information processing terminals via the communication network; determining whether or not the first specifying information included in the received one or more sets of data satisfies a predetermined condition; classifying the one or more sets of data determined to satisfy the condition into a same group; and generating and outputting an output file based on the one or more sets of data classified into the same group.

BRIEF DESCRIPTION OF THE DRAWINGS

The components in the drawings are not necessarily to scale relative to each other.

FIG. 4 is a drawing showing a data configuration of a network database storing a plurality of network identification information items.

FIG. 5 is a block diagram illustrating a configuration example of an electronic circuit of a teacher terminal.

FIG. 6 is a diagram showing a data configuration of a determination condition database.

FIG. 7 is a diagram showing a data configuration of a sensor data base.

FIG. 8 is a conceptual drawing showing a display example of a list of graphs generated based on sensor data acquired in the same class.

FIG. 11 is a conceptual drawing showing a configuration example of a display system according to a second embodiment.

FIG. 13 is a conceptual drawing showing a display example of a list of a plurality of graphs with accompanying imaging data and imaging time information.

FIG. 14A is a flow chart (1/2) showing an operation example of the display system according to the second embodiment.

FIG. 14B is a flow chart (2/2) showing an operation example of the display system according to the second embodiment.

FIG. 15 is a schematic drawing showing common procedures of an acid-base titration experiment.

FIG. 16 is a conceptual drawing showing a display example of a list of a plurality of graphs with accompanying imaging data and imaging time information.

DETAILED DESCRIPTION

First Embodiment

A display system according to a first embodiment will be described.

Figure 1:
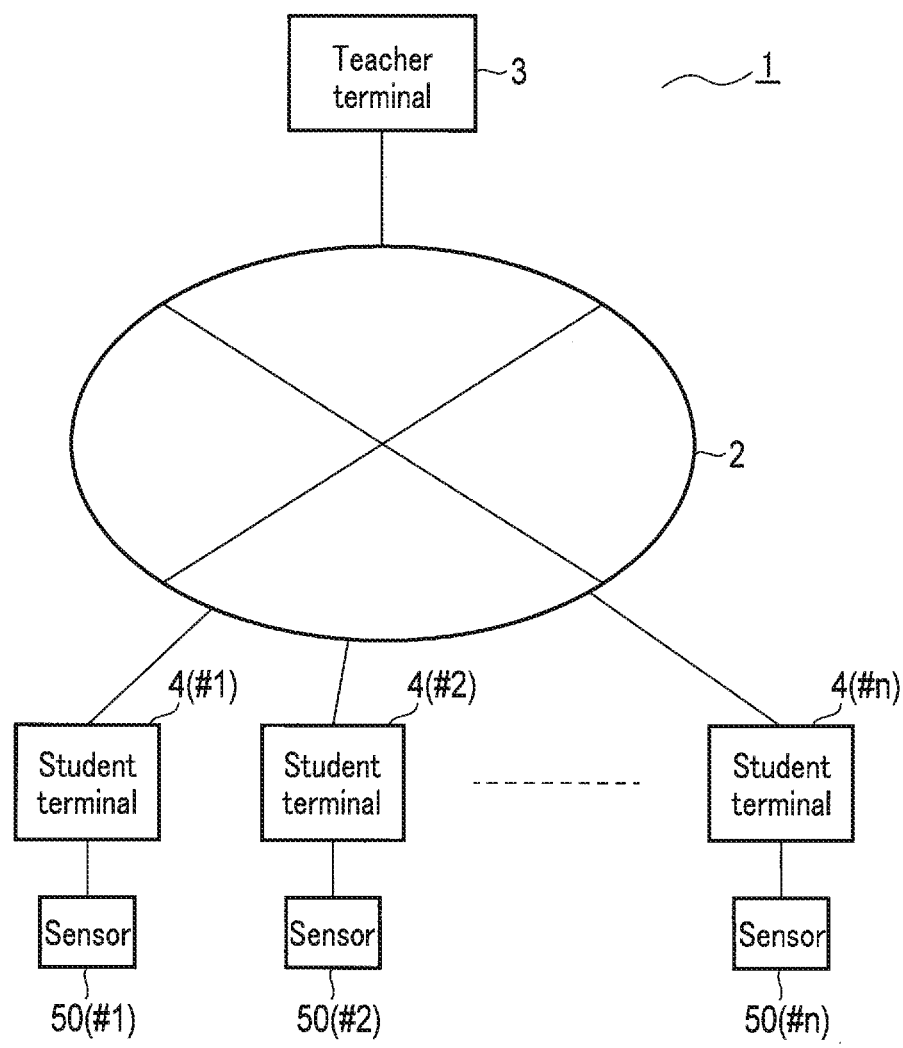
FIG. 1 is a conceptual drawing showing a configuration example of a display system according to a first embodiment.

FIG. 1 is a conceptual drawing showing a configuration example of a display system according to a first embodiment.

In the present embodiment, an example where data acquired in a scientific experiment is received by teacher A from each student of class B through the display system 1 will be described.

In this example, the display system 1 consists of a teacher terminal 3 and a plurality of student terminals 4 (#1 through #n) which are connected via a communication network 2, such as the Internet or a school intranet. The teacher terminal 3 herein is a device used by teacher A who is in charge of an experiment conducted by the students of class B. The student terminals 4 (#1 through #n) are devices used by the students of class B during the experiment.

Figure 2:
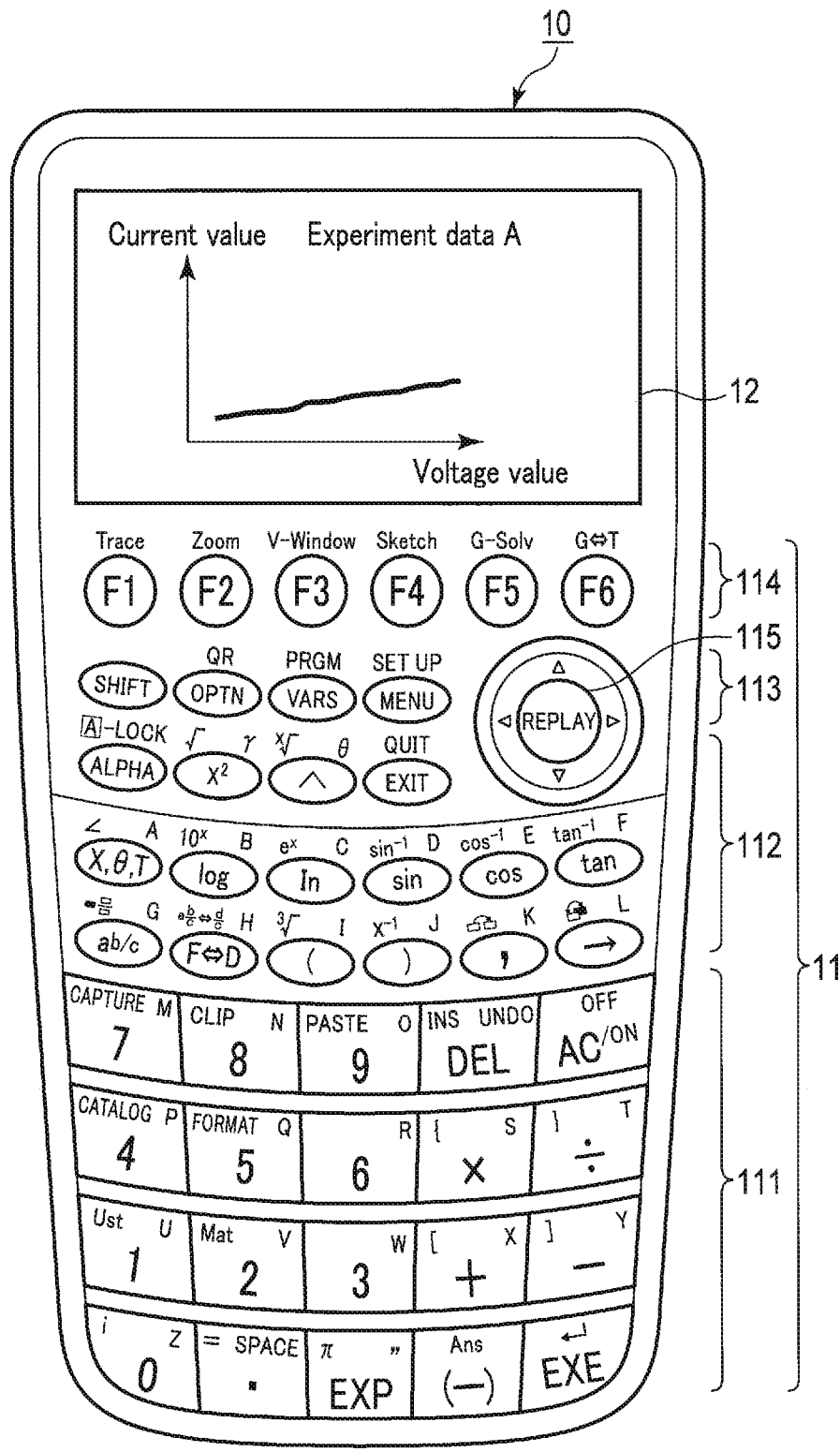
FIG. 2 is a front view of an appearance constitution of a graphing scientific calculator which is an example of an electronic device that may be used as a student terminal in the first embodiment.

The student terminal 4 is a device that transmits sensor data obtained by a sensor 50 (a result of detection by the sensor 50) to the teacher terminal 3 via the communication network 2, and can be realized by, for example, an electronic device, such as a graphing scientific calculator 10 shown in FIG. 2.

FIG. 2 is a front view of an appearance constitution of the graphing scientific calculator 10 which is an example of an electronic device that may be used as a student terminal 4.

Hereinafter, a graphing scientific calculator 10 such as the one shown in FIG. 2 will be explained as the student terminal 4; however, the student terminal 4 is not limited to the graphing scientific calculator 10, and may be configured as an electronic device, such as a tablet device, a personal computer, a smart phone, a mobile phone, a touch panel-type personal digital assistants (PDA), an electronic book, or a mobile game player, etc.

An electronic device (not shown), such as a tablet device not equipped with physical keys (buttons) like those provided in the graphing scientific calculator 10, displays a software keyboard similar to the keys of the graphing scientific calculator 10, and performs processing in response to key operations on the software keyboard.

The graphing scientific calculator 10 comes in a small size out of a need of portability so that a user can easily hold and operate it in one hand, and is provided with a key input unit 11 and a display 12 on its main body front surface.

In the key input unit 11, there exists a number and mathematical symbol key group 111 for inputting numerical values, mathematical expressions, and program commands and for instructing execution of calculation or a program; a mathematical function key group 112 for inputting various functions and for activating a memory function; a mode setting key group 113 for causing a display of a menu screen in various operation modes, such as a calculation mode and an algorithm mode, and for instructing setting of these operation modes; the function key group 114 for activating various functions displayed along the bottom of the display 12 by one-time key operation; and a cursor key 115 for moving a cursor displayed on the display 12 and selecting data items.

As the number and mathematical symbol key group 111, [0] through [9] (numerical values) keys, [+], [−], [×], and [÷] (four arithmetic operations symbols) keys, [EXE] ("execution") key, and [AC] ("clear") key, etc., are arranged.

As the mathematical function key group 112, [sin] ("sine") key, [cos] ("cosine") key, [tan] ("tangent") key, etc., are arranged.

As the mode setting key group 113, [MENU] ("menu") key, [SHIFT] ("shift") key, and [OPTN] ("option") key, etc., are arranged.

As the function key group 114, [F1] key through [F6] key are arranged.

Pressing the [SHIFT] key followed by any key of the number and mathematical symbol key group 111, the mathematical function key group 112, the mode setting key group 113, or the function key group 114 performs an alternate function indicated above the key, not the function indicated on the keycap. For example, pressing the [SHIFT] key followed by the [AC] key (hereinafter, such a key operation will be written as "[SHIFT]+[AC]") function as the [OFF] ("power off") key. Pressing [SHIFT]+[MENU] functions as the [SET UP] ("set up") key, and pressing [SHIFT]+[F3] key functions as the [V-Window] ("view window"; instruction to display a drawing region setting screen) key.

The display 12 is composed of a dot-matrix type liquid crystal display unit, for example. If the student terminal 4 is a tablet device, the display 12 is composed of a liquid crystal display unit provided with a touch panel thereon. The display 12 displays, in a form of graph, a result of computation obtained by executing a data acquisition program (the data acquisition program 22a shown in FIG. 3, which will be described later) on sensor data detected by the sensor 50.

Figure 3:
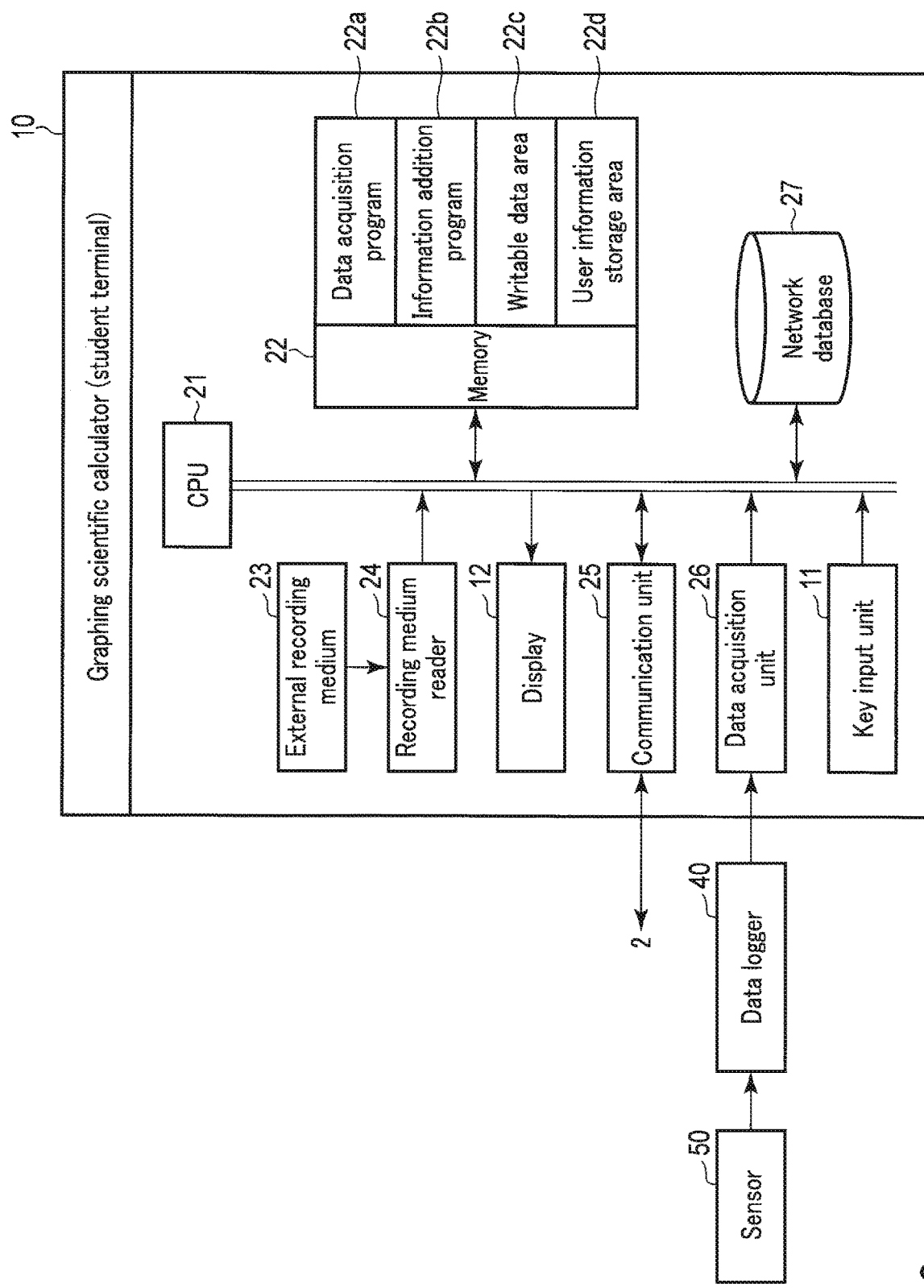
FIG. 3 is a block diagram of a configuration example of an electronic circuit of a graphing scientific calculator that can be used as a student terminal in the first embodiment.

FIG. 3 is a block diagram illustrating a configuration example of an electronic circuit of the graphing scientific calculator 10.

In addition to the key input unit 11 and the display 12, the electronic circuit of the graphing scientific calculator 10 includes a CPU 21 which is a computer, a memory 22, a recording medium reader 24, a communication unit 25, a data acquisition unit 26, and a network database 27.

The CPU 21 controls operations in each part of the circuit in accordance with the data acquisition program 22a and the information addition program 22b stored in the memory 22, and executes various computing processing in accordance with a key input signal from the key input unit 11. The data acquisition program 22a and the information addition program 22b may be either stored in the memory 22 in advance, or read from an external recording medium 23, such as a memory card, via the recording medium reader 24, and stored in the memory 22. The data acquisition program 22a and the information addition program 22b are write-protected from a user's operation on the key input unit 11.

In the memory 22, as an area for storing rewritable data other than the write-protected information, a writable data area 22c is reserved for storing data, such as various data consisting of key-code data subsequently-input through the keys of the key input unit 11, and intermediate data generated by processing performed by the data acquisition program 22a and the information addition program 22b. The user information storage area 22d is also reserved in the memory 22; it is thus possible to store information of students who use the graphing scientific calculator 10 (user information) prior to, for example, the start of an experiment. The user information consists of, at least one of a student's name, a group conducting an experiment (an experiment group to which a student belongs), or a class to which a student belongs.

The graphing scientific calculator 10 (the student terminal 4) configured as described above realizes the functions described below when the CPU 21 controls the operations in each part of the circuit in accordance with an instruction written by the data acquisition program 22a and the information addition program 22b, in such a manner that hardware and software operate in conjunction with each other.

The data acquisition unit 26 communicates with the data logger 40 via a wire or wirelessly. One or more sensors 50 are connected to the data logger 40. Examples of the sensor 50 include a temperature sensor, a voltage sensor, an electric current sensor, a pH sensor, an audio sensor, a photo gate sensor, and a pressure sensor, and the like; however, the examples are not limited thereto.

One or more sensors 50 can be connected to the data logger 40, and if connected, a sensor type of each connected sensor 50 is recognized, and sensor type information as a result of the recognition is transmitted to the data acquisition unit 26. The sensor data detected by each sensor 50 is acquired from each sensor 50, and the acquired sensor data is transmitted to the data acquisition unit 26. The data logger 40 may have a storing function (not shown) for temporarily storing the sensor data acquired from the sensor 50 before sending it to the data acquisition unit 26.

Upon receipt of the sensor type information and sensor data transmitted from the data logger 40, the data acquisition unit 26 generates a time stamp, and outputs the generated time stamp to the data acquisition program 22a, along with the received sensor type information and sensor data.

Since a time required for transmitting the sensor data detected by the sensor 50 from the sensor 50 to the data acquisition unit 26 via the data logger 40 is very short, the time stamp can be regarded as acquisition time information indicating a time when the sensor data is acquired by the sensor 50.

Although the data logger 40 is externally provided in the example shown in FIG. 3, it may be built in the graphing scientific calculator 10.

The data acquisition unit 26 can directly obtain from the sensor 50 the sensor data detected by the sensor 50, and if the sensor data can be accumulated in the writable data area 22c, the data logger 40 can be omitted and the sensor 50 can be directly connected to the data acquisition unit 26.

Herein, for a teacher in charge of an experiment, if there are multiple classes in which an experiment is conducted, one teacher (teacher A) may be in charge of all classes, or responsibility for the classes may be shared by a plurality of teachers. In other words, there are two cases: (A) one teacher (teacher A) is responsible for all the classes in which an experiment is conducted; and (B) a plurality of teachers share responsibility for the classes during which an experiment is conducted. As for a place where the students of class B conduct an experiment, (C) there may be only one classroom where an experiment can be held, or (D) there may be multiple classrooms where an experiment can be held (in other words, there is a possibility that an experiment may be conducted in not only class B but also other classes during the same period under supervision of the teachers who are respectively in charge of the classes). As for the communication network 2, (E) there may be only one communication network available for students' use, or (F) there may be multiple communication networks available for students' use, such as the Internet and a school intranet. In consideration of these circumstances, there are multiple combinations of a teacher terminal such as the teacher terminal 3 and the communication network 2 for a case where an experiment is conducted in a certain class. Accordingly, in order to set a combination of a communication network 2 used by the students of class B and a teacher terminal 3 of teacher A, who is in charge of an experiment in class B, the network database 27 preferably stores a single piece of network identification information for identifying predetermined communication network 2 and teacher terminal 3 as a network and a teacher terminal with which the graphing scientific calculator 10 communicate. One communication network 2 with which the graphing scientific calculator 10 communicates can be designated by teacher A in advance, for example.

A teacher A's designation of a communication network 2 (e.g., the Internet or a school intranet) to be used during an experiment can be conveyed to the students of class B verbally or in writing on a blackboard, and in this case, the students of class B individually set the communication network 2 to be used during an experiment with their student terminals 4 (#1 through #n). Alternatively, if the student terminal 4 of each student of class B is operating under a circumstance where the terminal 4 can communicate with the teacher terminal 3 of teacher A through an e-mail or a messenger application, etc., teacher A can inform the students of the communication network 2 to be used in an experiment (for example, the Internet and a school intranet) through delivery of information regarding the communication network 2 to the student terminals 4 (#1 through #n) via an email or a messenger application, etc. Also in this case, the students of class B individually set the communication network 2 to be used during an experiment with their student terminals 4 (#1 through #n). As another alternative, if the students of class B set the communication network 2 informed by teacher A with their student terminal 4 (#1 through #n), it is preferable not only that the students have the network database 27 store the information regarding the communication network 2 delivered from teacher A but also that the students manually connect the student terminals 4 (#1 through #n) to the communication network 2 designated by teacher A, so that the sensor data etc. can be transmitted to the teacher terminal 3. If sensor data, etc. can be transmitted to the teacher terminal 3 after the students manually connect the student terminals 4 (#1 through #n) to the communication network 2 designated by teacher A, at the very least it no longer becomes necessary to perform the processing thereafter (to be described later) to connect the student terminals 4 (#1 through #n) to the communication network 2 using at least network identification information.

In a case where multiple communication networks 2 are available for the students of class B, in order to deal with any combination of a communication network 2 available for the students of class B and a teacher terminal 3 of teacher A, the network database 27 may preferably store a plurality of network identification information items for identifying a communication network 2 and a teacher terminal 3 as those with which the graphing scientific calculator 10 communicate. In order to deal with any combination of a communication network 2 available for the students of a predetermined class and any one of the teacher terminals of a plurality of teachers who are in charge of an experiment (namely, not only the teacher terminal 3 of teacher A but also the other teachers' terminals), the network database 27 may store a plurality of network identification information items for identifying a predetermined teacher terminal, such as the teacher terminal 3, and a communication network 2 with which the graphing scientific calculator 10 communicate.

The teacher A's determination of a communication network 2 can be informed to the students of class B in a manner similar to the above-described manner. When the students of class B receive from teacher A an instruction regarding a communication network 2 to be used during an experiment, the students may select and set, based on the instruction, a corresponding combination from multiple combinations of a teacher terminal, such as the teacher terminal 3, and a communication network 2. If the network database 27 stores a plurality of network identification information items, the student terminal 4 may automatically determine and set a combination of a communication network 2 to be used during an experiment by teacher A and the students of class B and the teacher terminal 3, in accordance with a predetermined determination condition, as described above.

Combinations of a teacher terminal, such as the teacher terminal 3, and a communication network 2 to be used when an experiment is conducted in a predetermined class may be stored in the network database 27 in advance, and when the students of class B receive an instruction from teacher A regarding a communication network 2 to be used, the students may select and set a corresponding combination from the combinations.

Upon acquisition of the sensor type information, the sensor data, and the time stamp from the data acquisition unit 26, the data acquisition program 22a acquires network identification information from the network database 27. If the network database 27 stores only a predetermined network identification information item, the data acquisition unit 26 acquires this network identification information.

In contrast, if the network database 27 stores a plurality of network identification information items, the data acquisition program 22a determines the communication network 2 and the teacher terminal 3 with which the graphing scientific calculator 10 should communicate based on at least one of the sensor type information or the time stamp in accordance with a predetermined determination reference, and obtains corresponding network identification information.

As an example of a determination reference, in a case where a current-voltage experiment is conducted in teacher A's class in a second period (from 9:35 a.m. to 10:20 a.m.) of today, if the time stamp indicates a time between 9:35 a.m. and 10:20 a.m. of today, and the sensor type information indicates "multimeter", the network identification information in which the teacher terminal 3 of teacher A and its dedicated communication network 2 are designated is network identification information to be acquired from the network database 27.

FIG. 4 is a drawing showing a data configuration of the network database 27 storing a plurality of network identification information items. With such a data configuration of the network database 27, it is possible to specify, based on the time stamp and sensor type information received from each student terminal 4, network identification information including the information specifying the teacher terminal 3 of teacher A and the information specifying the communication network 2 that the students of class B can connect to, as network identification information that needs to be acquired. If network identification information is uniquely determined based on one of the time stamp or the sensor type information, the network database 27 does not necessarily include the other of the time stamp and the sensor type. If network identification information is uniquely determined regardless of the time stamp and the sensor type information, the network database 27 does not have to include both of the time stamp and the sensor type. Furthermore, specified network identification information may include at least only minimum information necessary for specifying a group (to be described later), for example information for specifying the teacher terminal 3 of teacher A.

After network identification information is thus obtained from the network database 27, the data acquisition program 22a further obtains user information from the user information storage area 22d, and outputs the obtained network identification information and user information to the information addition program 22b, along with the sensor type information, the sensor data, and the time stamp.

Upon receipt of the network identification information, sensor type information, sensor data, time stamp, and user information output from the data acquisition program 22a, the information addition program 22b adds the sensor type information, time stamp, network identification information, and user information to the sensor data, and outputs the sensor data to which those information items are added to the communication unit 25.

When the sensor data to which the network identification information, the sensor type information, the time stamp, and the user information are added is output from the information addition program 22b, the communication unit 25 knows the communication network 2 and the teacher terminal 3 from the network identification information added to the sensor data. Then, upon receipt of the sensor data to which the network identification information, the sensor type information, the time stamp, and the user information are added, the communication unit 25 transmits the received sensor data to the teacher terminal 3 via the communication network 2 known from the sensor data.

FIG. 5 is a block diagram illustrating a configuration example of an electronic circuit of the teacher terminal 3.

The electronic circuit of the teacher terminal 3 includes a CPU 31 which is a computer, a recording medium reader 32, a display 33, a communication unit 34, a key input unit 35, a memory 36, a determination condition database 37, and a sensor database 38.

Similar to the student terminal 4, the teacher terminal 3 can also be configured as an electronic device, such as a tablet device, a personal computer, a smart phone, a mobile phone, a touch panel-type personal digital assistant (PDA), an electronic book, or a mobile game player, etc.

The memory 36 stores the determination program 36a, the classification program 36b, and the display control program 36c.

The CPU 31 controls operations in each parts of the circuit in accordance with the determination program 36a, the classification program 36b, and the display control program 36c, and executes various computing processing in accordance with a key input signal from the key input unit 35. The determination program 36a, the classification program 36b, and the display control program 36c may be either stored in the memory 36 in advance, or read from an external recording medium 39, such as a memory card, via the recording medium reader 32, and stored in the memory 36. The determination program 36a, the classification program 36b, and the display control program 36c are write-protected from a user's operation of the key input unit 35.

In the memory 36, as an area for storing rewritable data other than the write-protected information, a writable data area 36d is reserved for storing data, such as various data consisting of key-code data subsequently input through the keys of the key input unit 35, and intermediate data generated by processing performed by the determination program 36a, the classification program 36b, and the display control program 36c.

In the teacher terminal 3, the functions described below are realized when the CPU 31 controls the operations in each part of the circuit in accordance with an instruction written by the determination program 36a, the classification program 36b, and the display control program 36c in such a manner that hardware and software operate in conjunction with each other.

The communication unit 34 receives the sensor data transmitted from the student terminal 4 via the communication network 2. As described above, the sensor type information, the time stamp, the network identification information, and the user information are added to the sensor data transmitted from the student terminal 4. Upon receipt of such sensor data, the communication unit 34 outputs the sensor data to the determination program 36a.

The determination condition database 37 stores determination conditions generated in advance by a user who is in a supervisory position, such as a teacher. As an example of generation of determination conditions, if teacher A wants to collect sensor data obtained in a current-voltage experiment conducted in the class during the second period (from 9:35 a.m. to 10:20 a.m.) of today from the student terminals 4, teacher A generates a determination condition, through operating the key input unit 35 of the teacher terminal 3, in which the following information items are designated: the network identification information including a communication network 2 used by the student terminals 4 and information regarding the teacher terminal 3; the time range of the time stamp (between 9:35 a.m. and 10:20 a.m. of today); and the sensor type information (for example, "multimeter"). The determination conditions thus generated are stored in the determination condition database 37.

When the sensor data to which the sensor type information, time stamp, network identification information, and user information are added is output from the communication unit 34, the determination program 36a determines whether or not the sensor type information, the time stamp, and the network identification information satisfy the determination condition by referring to the determination condition stored in the determination condition database 37.

If the network identification information and sensor type information added to the sensor data match those designated in the determination condition, and the time stamp added to the sensor data is included in the time range designated in the determination condition, the determination program 36a determines that the sensor data satisfies the determination condition; otherwise, it is determined that the sensor data does not satisfy the determination condition.

Upon determination that the sensor data satisfies the determination condition, the determination program 36a outputs the sensor data to the classification program 36b along with the added information. On the other hand, if it is determined that the sensor data does not satisfy the determination condition, the determination program 36a determines that the sensor data is inappropriate, and discards it.

The classification program 36b classifies the sensor data output from the determination program 36a into groups, such as classes according to the content of the determination condition used in the determination made in the determination program 36a, that is, the network identification information, the acquisition time information, and the sensor type information. Classification information designating a group (class) is added to each sensor data output from the determination program 36a, and the sensor data is stored in the sensor database 38.

If the teacher were to conduct many classes, sensor data would be transmitted from a large number of student terminals 4 to the teacher terminal 3 every time a class is conducted. Accordingly, the teacher would normally cause the determination condition database 37 of the teacher terminal 3 to store many determination conditions. In this case, it is necessary to identify the class from which the sensor data is acquired, even if the sensor data satisfies a determination condition. For this reason, the classification program 36b classifies the sensor data into groups through adding, to said sensor data, classification information indicating which determination condition the sensor data satisfies, and thereafter outputs the classified sensor data to the sensor data database 38, causing the database 38 to store the sensor data.

FIG. 6 is a drawing showing a data configuration of the determination condition database 37, and FIG. 7 is a drawing showing a data configuration of the sensor data database 38. The determination condition database 37 includes a determination conditions 371 and classification names 372, which are prepared by a teacher in advance. The classification names are group names into which sensor data is classified if the sensor data satisfies a determination condition. With such a data configuration of the determination condition database 37, it is possible to specify a group into which the sensor data is classified, based on the time stamp and sensor type information received from each student terminal 4, and the obtained network identification information. As described above, if the network identification information is uniquely determined regardless of the time stamp and the sensor type information, and the network identification information includes only the information specifying the teacher terminal 3, in other words, does not include information specifying a communication network 2, a group into which the sensor data is classified can be specified based only on the information specifying the teacher terminal 3. The sensor data identification information that identifies each of a plurality of sensor data items received from a plurality of the student terminals 4 (in FIG. 7, student a, b, . . . ) is associated with identification information of the specified group (class ID), and they are stored in the sensor data database 38 having the data configuration shown in FIG. 7.

The display control program 36c acquires the sensor data belonging to the same group, namely a plurality of sensor data items to which the same classification information is added, from the sensor database 38, and displays a list of the graphs generated from the sensor data items on the display 12.

FIG. 8 is a conceptual drawing showing a display example of a list of a plurality of graphs generated based on the sensor data items belonging to the same class displayed on the display 33 of the teacher terminal 3.

Figure 9:
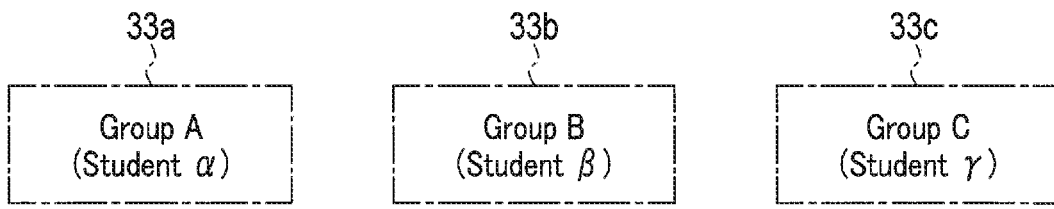
FIG. 9 is a drawing showing another display example of the student's information (user information) in FIG. 8.

FIG. 8 shows an example of three voltage-current graphs (a), (b), and (c) generated from the sensor data respectively acquired by three students (α, β, and γ) in the voltage-current experiment conducted in the same class to provide students' understanding of Ohm's law. In the present embodiment, the voltage-current graph is associated with student's information (user information) based on the sensor data acquired by each student and the user information added to the sensor data, and these are displayed. Specifically, in the voltage-current graph (a), a voltage-current graph corresponding to a result of the experiment conducted by the student α, and student α's information (user information) 33a are displayed together; in the voltage-current graph (b), a voltage-current graph corresponding to a result of the experiment conducted by the student β, and student β's information (user information) 33b are displayed together; and in the voltage-current graph (c), a voltage-current graph corresponding to a result of the experiment conducted by the student γ, and student γ's information (user information) 33c are displayed together. If the experiment is not conducted by each student of class B but by a plurality of groups of the students, it is preferable that, as shown in FIG. 9, not only the name of a student who transmits sensor data, etc. to the teacher terminal 3 through the operation of the student terminal 4 but also, for example, a group to which the student belongs are displayed in the student α's information (user information) 33a, the student β's information (user information) 33b, and the student γ's information (user information) 33c. As described above, the teacher terminal 3 displays a list of results of the experiment conducted by the students on the display 33.

Next, an example of the operation of the display system 1 according to the present embodiment, and having the above-described configuration, will be described.

Figure 10A:
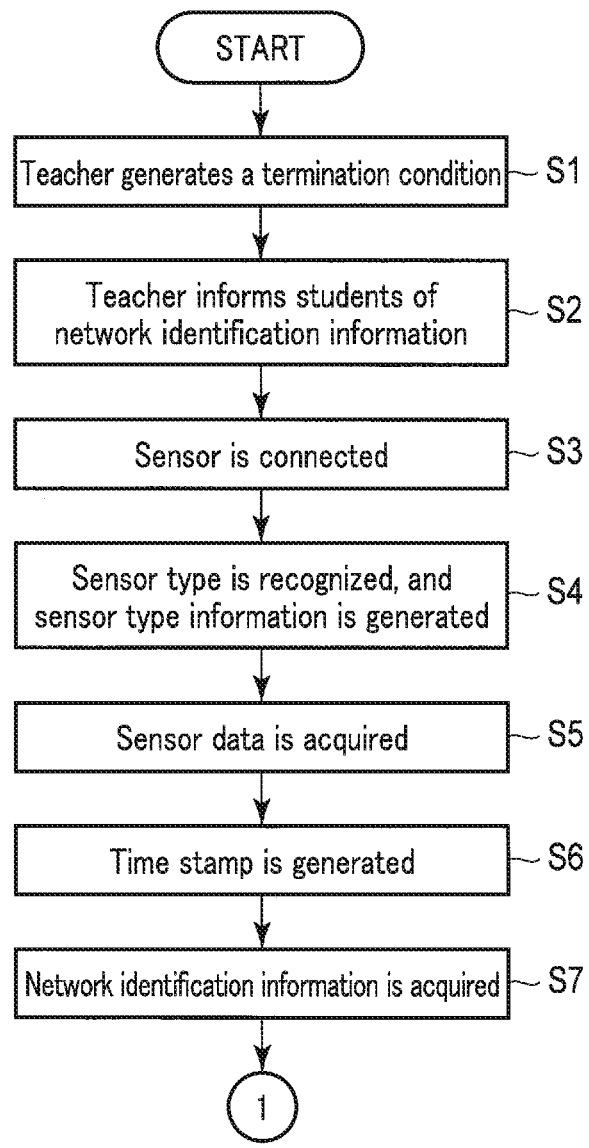
FIG. 10A is a flow chart (1/2) showing an operation example of the display system according to the first embodiment.
Figure 10B:
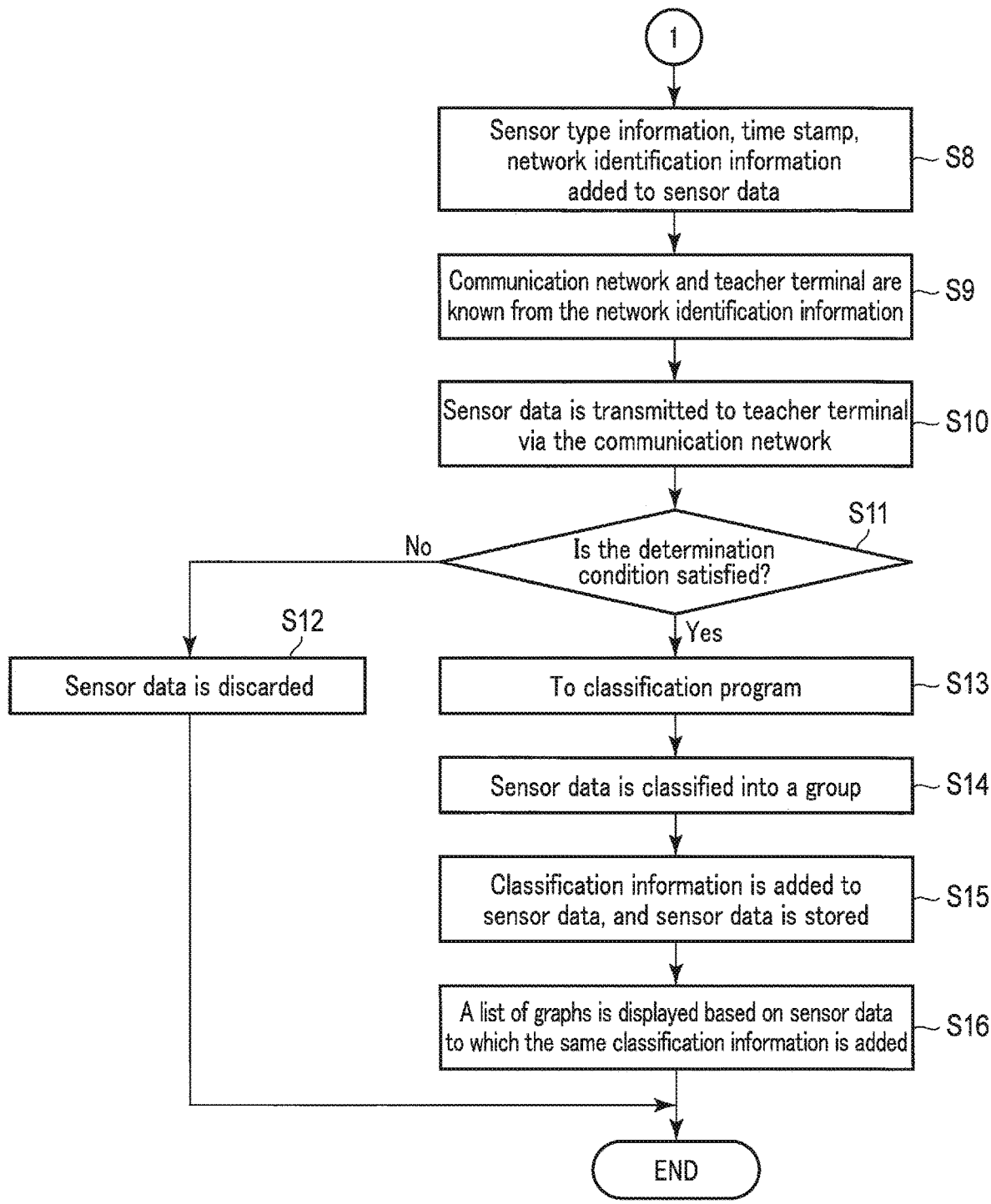
FIG. 10B is a flow chart (2/2) showing an operation example of the display system according to the first embodiment.

FIGS. 10A and 10B show a flow chart showing an operation example of the display system 1 according to the first embodiment.

Herein, an example where a current-voltage experiment is conducted in class B, of which teacher A is in charge, during a second period (from 9:35 a.m. to 10:20 a.m.) on XX(month)/##(date)/2018, and the students of class B transmit sensor data obtained during the experiment from the student terminals 4 to the teacher terminal 3, will be described.

In this example, teacher A first generates, through an operation of the key input unit 35 of the teacher terminal 3, a determination condition in which network identification information C, which in turn includes the information regarding the teacher terminal 3 and the information regarding the communication network 2 to be used by teacher A and the students of class B, a time range of a time stamp (2018:XX:##:09:35:00:00 through 2018:XX:##:10:25:59:59) D, and the sensor type information E (multimeter) are designated, and causes the determination condition database 37 to store the generated condition (S1).

Teacher A informs the graphing scientific calculator 10 of each student of class B of the network identification information C through the communication unit 34 of the teacher terminal 3 with the use of, for example, emails or a messenger application, etc., and causes the network database 27 of the graphing scientific calculator 10 of each student to store the network identification information C. Alternatively, teacher A informs the students of class B of the network identification information C verbally or via writing on a black board, etc., and each of the students causes the network database 27 of the graphing scientific calculator 10 to store the network identification information C (S2). The preparation before the data acquisition is thus finished. FIG. 10A shows an example in which step S1 and step S2 are performed before the experiment begins; however, step S1 and step S2 may be performed during or after the experiment, as long as the steps are performed before the sensor data is transmitted to the teacher terminal 3. A method of storing the network identification information C in the network database 27 of the graphing scientific calculator 10 of each student is not limited to the above-described method, and any appropriate method well known to a person with ordinary skill in the art may be adopted. Herein, in a case where a student of class B stores the network identification information C informed by teacher A in the network database 27 of the graphing scientific calculator 10, the student may connect the graphing scientific calculator 10 to the communication network 2 (the network 2 informed by teacher A) through a manual operation based on the network identification information C so as to bring the calculator in a state where sensor data, etc. can be transmitted to the teacher terminal 3.

When an experiment actually begins, first, the data logger 40 is connected to the data acquisition unit 26 of the graphing scientific calculator 10 (student terminal 4), and the sensor 50 is connected to the data logger 40 (S3). In this example, as a current-voltage experiment is conducted, a multimeter is connected to the data logger 40 as a sensor 50.

Once the sensor 50 (multimeter) is connected to the data logger 40, a type of the connected sensor 50 is recognized by the data logger 40, and sensor type information (multimeter) is generated and transmitted to the data acquisition unit 26 as a recognition result (S4).

Furthermore, when a current value and a voltage value are detected by the sensor 50 (multimeter), sensor data, which is a detection result, is transmitted to the data acquisition unit 26 from the sensor 50 (multimeter) via the data logger 40 (S5).

In the data acquisition unit 26, when the sensor type information (multimeter) and the sensor data (a current value and a voltage value) are transmitted from the data logger 40, a time stamp is generated, and the generated time stamp is output to the data acquisition program 22a along with the sensor type information (multimeter) and the sensor data (a current value and a voltage value) (S6).

Since a time required for transmitting the sensor data detected by the sensor 50 from the sensor 50 to the data acquisition unit 26 via the data logger 40 is very short, the time stamp can be regarded as acquisition time information indicating a time when the sensor data is acquired by the sensor 50.

In the data acquisition program 22a, when the sensor type information (multimeter), the sensor data (a current value and a voltage value), and the time stamp are output from the data acquisition unit 26, the network identification information C is obtained from the network database 27 (S7).

Herein, the present embodiment is not limited to the case where only one network identification information item (e.g., network identification information C) is stored in the network database 27, and a plurality of network identification information items may be stored therein. If a plurality of network identification information items are stored, network identification information, in which a communication network 2 determined based on either the sensor type information or the time stamp, and a teacher terminal 3 are defined, is obtained by the data acquisition program 22a in accordance with a predetermined determination reference. In the foregoing step S2, if the graphing scientific calculator 10 is connected to the communication network 2 informed by teacher A through a manual operation of the student of class B and is in a state where sensor data, etc. can be transmitted to the teacher terminal 3, the network identification information including the information regarding the connected communication network 2 and the teacher terminal 3 of teacher A may be acquired.

As an example of a determination reference, in a case where a current-voltage experiment is conducted in teacher A's class during a second period (from 9:35 a.m. to 10:20 a.m.) of today, if the time stamp indicates a time between 9:35 a.m. and 10:20 a.m. of today, and the sensor type information indicates "multimeter", the network identification information C, in which the teacher terminal 3 of teacher A and its dedicated communication network 2 are designated, is network identification information to be acquired by the graphing scientific calculator 10.

In the data acquisition program 22a, once the network identification information C is acquired, user information is further acquired from the user information storage area 22d, and the acquired network identification information C and user information are output to the information addition program 22b, along with corresponding sensor information (multimeter), sensor data (a current value and a voltage value) and time stamp.

In the information addition program 22b, when the sensor data (a current value and a voltage value), the sensor type information (multimeter), the time stamp, the network identification information C, and the user information are output from the data acquisition program 22a, the sensor type information (multimeter), the time stamp, the network identification information C, and the user information are added to the sensor data, and the sensor data is then output to the communication unit 25 (S8).

In the communication unit 25, from the network identification information C added to the sensor data output from the information addition program 22b, a communication network 2 to be used by teacher A and the students of class B (e.g., the Internet or a school intranet), and a teacher terminal 3 of teacher A are known (S9). Then, the sensor data (to which the network identification information C, the sensor type information (multimeter), the time stamp, and the user information are added) is transmitted to the teacher terminal 3 of teacher A, via the known communication network 2 (S10). In the foregoing step S2, if the graphing scientific calculator 10 is connected to the communication network 2 informed by teacher A through a manual operation of the student of class B and is in a state where sensor data, etc. can be transmitted to the teacher terminal 3, the processing herein of knowing the communication network 2 to be used by teacher A and the students of class B and the teacher terminal 3 of teacher A is omitted.

In the teacher terminal 3 of teacher A, the sensor data (a current value and a voltage value) transmitted from the student terminal 4 of a student of class B via the communication network 2 is received by the communication unit 34. To this sensor data (a current value and a voltage value), the sensor type information (multimeter), the time stamp, the network identification information C (communication network), and the user information are added, as described above. Such sensor data is further output to the determination program 36a from the communication unit 34.

When such sensor data (a current value and a voltage value) is output from the communication unit 34, it is determined in the determination program 36a whether or not the network identification information C, time stamp, and sensor type information (multimeter) added to the sensor data satisfy the determination condition by referring to the determination condition stored in the determination condition database 37 (S11). Herein, the user information is not used.

If the network identification information C and sensor type information E (multimeter) added to the sensor data match those designated in the determination condition, and the time stamp added to the sensor data is included in the time range D designated in the determination condition, the determination program 36a determines that the network identification information C, time stamp, and sensor type information added to the sensor data satisfy the determination condition; otherwise, it is determined that those information items do not satisfy the determination condition.

In the determination program 36a, when it is determined that the determination condition is satisfied (Yes in S11), the sensor data (a current value and a voltage value) is output to the classification program 36b, along with the information items added to the sensor data, namely the network identification information C, the time stamp, the sensor type information (multimeter), and the user information (S13).

If it is determined that the determination condition is not satisfied on the other hand (No in S11), the sensor data is determined not to be appropriate and discarded by the determination program 36a (S12).

After step S13, in the classification program 36b, the sensor data (a current vale and a voltage value) output from the determination program 36a is classified into groups (for example, classes) according to the content of the determination condition used in the determination made in the determination program 36a, namely the network identification information C, the acquisition time information, and the sensor type information (multimeter) E (S14). Then, classification information designating a group (class) is added to each sensor data (a current value and a voltage value) output from the determination program 36a, and the sensor data is stored in the sensor database 38. Thus, the sensor data (a current value and a voltage value) is stored in the sensor data database 38 with an identification of a group to which the sensor data belongs (S15).

Thereafter, courtesy of the display control program 36c, the sensor data (a current value and a voltage value) acquired in the same class, in other words, the sensor data to which the same classification information is added, is acquired from the sensor data database 38, and a list of graphs generated based on the sensor data is displayed on the display 33, as shown in FIG. 8 for example (S16).

FIG. 8 is a conceptual drawing showing a display example of a list of graphs generated based on sensor data acquired in a same class on the display 33.

FIG. 8 shows three voltage-current graphs (a), (b), and (c) generated from the sensor data (a current value and a voltage value) respectively acquired by three students ($\alpha$, $\beta$, and $\gamma$) in the voltage-current experiment in the same class to provide students' understanding of Ohm's law. Herein, for example, in the voltage-current graph (a), a voltage-current graph corresponding to a result of the experiment conducted by the student $\alpha$, and student $\alpha$'s information (user information) 33a are together displayed; in the voltage-current graph (b), a voltage-current graph corresponding to a result of the experiment conducted by the student $\beta$, and student $\beta$'s information (user information) 33b are displayed together; and in the voltage-current graph (c), a voltage-current graph corresponding to a result of the experiment conducted by the student $\gamma$, and student $\gamma$'s information (user information) 33c are displayed together. Information of each of students $\alpha$, $\beta$, and $\gamma$ (user information) is displayed in the periphery of (above in the present embodiment) the voltage-current graph corresponding to an experiment result obtained by each of students $\alpha$, $\beta$, and $\gamma$.

In the present voltage-current experiment, resistors having different resistance values are respectively given to students $\alpha$, $\beta$, and $\gamma$, and a current and a voltage flowing on serial circuit via the resistor are measured by a multimeter which serves as the sensor 50 and obtained as sensor data. The voltage-current graphs (a), (b), and (c) shown in FIG. 8 are generated based on the thus-measured sensor data.

As described above, in the display system 1 according to the present embodiment, it is possible to automatically determine, through the above-described operation, whether or not the sensor data transmitted from the student terminals 4 of the students of class B is sensor data acquired in the same class conducted in the same classroom, based on three conditions, namely network identification information, acquisition time information, and sensor type information.

Accordingly, it no longer becomes necessary for teacher A to check whether or not the sensor data transmitted from the student terminals 4 of the students of class B is acquired in the same class. It is thereby possible for teacher A to make the most of limited time for his or her class, without wasting the time for checking the students' sensor data.

Furthermore, a display of a list of the graphs on the display 33 allows teacher A to comprehensively check a plurality of voltage-current graphs generated from the sensor data acquired by the students of class B. Consequently, for example, it becomes easy to determine from the displayed user information which student was able to conduct an experiment properly and which student was not. Furthermore, for example, through showing a list of the voltage-current graphs displayed on the display 33 as shown in FIG. 8 to the students of class B, it becomes easier to explain the Ohm's law to the students.

On the students' side, through looking at a list, like the one shown in FIG. 8, displayed on the display 33 of the teacher terminal 3, the students can easily understand that a current and a voltage are in a proportional relationship, and a slope of the relationship is determined by a type of a resistor (resistance value).

Thus, according to the display system 1 of the present embodiment, it is possible to eliminate teacher's troubles, increase the time used for delivering an effective class, and immediately and easily provide information necessary to aid students' understanding. It is thereby possible to contribute to the realization of more effective class.

Second Embodiment

A display system according to a second embodiment will be described.

The second embodiment is a modification of the first embodiment. Accordingly, repetitive descriptions will be avoided hereinafter, and only differences between the first and second embodiments will be described. For this reason, the same constituent elements will be referred to by the same reference numerals as in the first embodiment.

FIG. 11 is a conceptual drawing showing a configuration example of a display system 1 according to the second embodiment.

Figure 12:
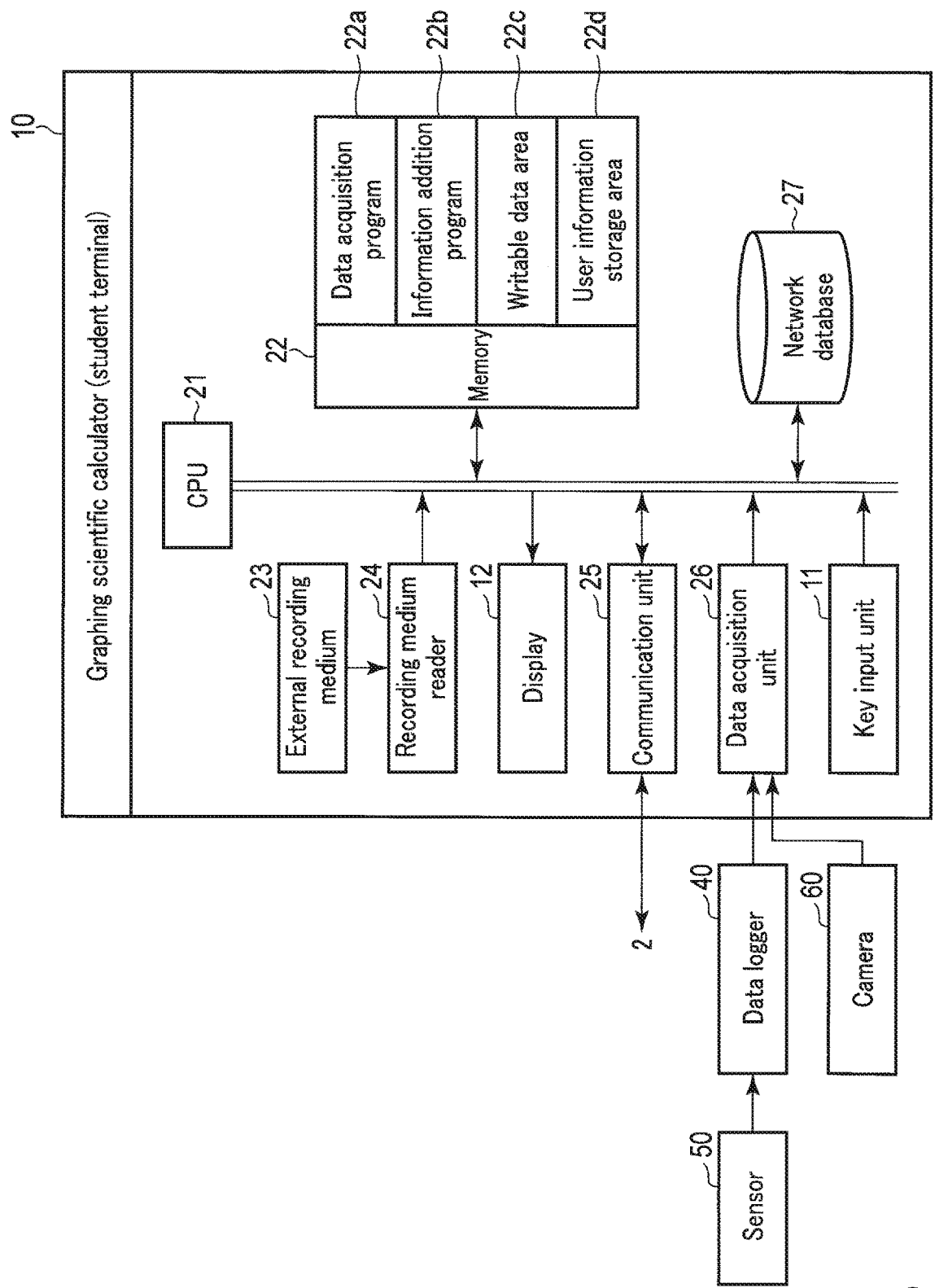
FIG. 12 is a block diagram of a configuration example of an electronic circuit of a graphing scientific calculator that can be used as a student terminal in the second embodiment.

FIG. 12 is a block diagram of a configuration example of an electronic circuit of a graphing scientific calculator 10 that can be used as a student terminal 4 in the second embodiment.

In the present embodiment, as shown in FIG. 11, a camera 60, such as a digital camera, is connected to the student terminal 4. FIG. 12 shows a configuration in a case where the camera 60 is connected to the graphing scientific calculator 10, which is an example of the student terminal 4.

FIG. 11 shows the same as FIG. 1, except that the camera 60 is connected to the student terminal 4. FIG. 12 is the same as FIG. 3, except that the camera 60 is connected to the data acquisition unit 26.

The camera 60 takes a still picture or a video in accordance with a user's (student's) operation, and the imaging data to which imaging time information is added is output to the data acquisition unit 26. The camera 60 is not necessarily connected to the data acquisition unit 26 for the entire duration, and only when imaging data is transferred to the data acquisition unit 26 does the camera 60 need to be connected to the data acquisition unit 26.

It is thereby possible to output imaging data to which imaging time information is added from the camera 60 to the data acquisition unit 26, in addition to the sensor type information and the sensor data from the data logger 40.

If the data acquisition unit 26 outputs the sensor type information and the sensor data to the data acquisition program 22a along with the time stamp, the data acquisition unit 26 also outputs the imaging data obtained from the camera 60 and to which the imaging time information is added.

It is thereby possible for the data acquisition program 22a to acquire, from the data acquisition unit 26, the imaging data to which the imaging time information is added in addition to the sensor type information, the sensor data, and the time stamp.

As described in the first embodiment, the data acquisition program 22a obtains the network identification information C from the network database 27, and further obtains the user information from the user information storage area 22d, and outputs the obtained network identification information C and the user information to the information addition program 22b, along with the sensor type information, the sensor type, the time stamp, and the imaging time information.

Upon receipt of the network identification information C, the sensor type information, the sensor data, the time stamp, the user information, and the imaging data, output from the data acquisition program 22a, to which the imaging time information is added, the information addition program 22b adds the sensor type information, the time stamp, the network identification information, and the user information to the sensor data, and outputs the sensor data to the communication unit 25. The imaging data to which the imaging time information is added is also output to the communication unit 25.

As described in the first embodiment, the communication unit 25 can know the communication network 2 and the teacher terminal 3 from the network identification information added to the sensor data. Then, the communication unit 25 transmits the sensor data to which the network identification information, the sensor type information, the time stamp, and the user information are added, and the imaging data to which the imaging time information is added to the teacher terminal 3 via the known communication network 2. Similar to the first embodiment, if the graphing scientific calculator 10 is connected to the communication network 2 informed by teacher A through a manual operation of the student of class B and is in a state where sensor data, etc. can be transmitted to the teacher terminal 3, the processing of knowing the communication network 2 to be used by teacher A and the students of class B, and the teacher terminal 3 of teacher A becomes unnecessary.

As shown in FIG. 5, when these information items transmitted from the communication unit 25 of each student terminal of class B are received by the communication unit 34 of the teacher terminal 3, the communication unit 34 outputs, to the determination program 36a, the sensor data to which the network identification information, the sensor type information, the time stamp, and the user information are added, along with the imaging data to which the imaging time information is added.

The determination program 36a performs processing similar to that described in the first embodiment. In this processing, imaging data to which the imaging time information is added is not used.

In the classification program 36b, as described in the first embodiment, classification information is added to each sensor data output from the determination program 36a, and the sensor data is stored in the sensor data database 38. In the present embodiment, the sensor data to which the classification information is added is stored in the sensor data database 38, along with the imaging data to which the imaging time information is added, which has been received by the communication unit 34 along with the sensor data.

As described in the first embodiment, the display control program 36c acquires, from the sensor data database 38, a plurality of sensor data items to which the same classification information is added, and displays a list of graphs generated from the sensor data items on the display 33. In the present embodiment, in addition to the graphs, the imaging data, which has been received by the communication unit 34 along with the sensor data, is respectively associated with the graphs and displayed in list form on the display 33, along with the added imaging time information.

FIG. 13 is a conceptual drawing showing a display example of a list of graphs generated based on the sensor data to which the same classification information (e.g., the same class) is added, along with the imaging data and the imaging time information, which have been received along with the sensor data by the communication unit 34.

In the example of FIG. 13, three neutralization curves (a-1), (b-1), and (c-1) generated based on the sensor data acquired by three students, namely students α, β, and γ, imaging data (a-2), (b-2), and (c-2) during the experiment, and the imaging time information (a-3), (b-3), and (c-3) are displayed. The imaging data may be a still image or a video. If the imaging data is a video, seek bars (a-4), (b-4), and (c-4) indicating replay positions of the videos are respectively displayed in the periphery of the imaging time information (a-3), (b-3), and (c-3), for example below the imaging time information (a-3), (b-3), and (c-3).

Next, an example of the operation of the display system 1 according to the present embodiment having the above-described configuration will be described.

FIGS. 14A and 14B show a flow chart showing an operation example of the display system 1 according to the second embodiment.

In FIGS. 14A and 14B, the same operations as those in FIGS. 10A and 10B are indicated by the same step numbers, and hereinafter repetitive descriptions will be avoided. As for the operations similar to those in FIGS. 10A and 10B, for example an operation similar to the step of "S3" is labeled as "S3A", so that the operations similar to those in FIGS. 10A and 10B can be clearly distinguished in FIGS. 14A and 14B.

In the example described hereinafter, teacher A holds class B during a second period (9:35 a.m. to 10:20 a.m.) on XX (month)/##(day)/2018, and during the class, an acid-base titration experiment in which an acetic acid solution, to which a small amount of phenolphthalein solution is added in advance, is titrated with a sodium hydroxide (NaOH) solution, and each student transmits, from the student terminal 4 to the teacher terminal 3, sensor data (pH) obtained in the experiment and imaging data (video data during the titration) to which imaging time information is added.

Hereinafter, procedures of a typical acid-base titration experiment will be briefly described with reference to FIG. 15.

As shown in FIG. 15 (a), a teacher's-designated volume of acetic acid is precisely measured with a volumetric pipette 200, and transported into a conical flask 210.

Next, as shown in FIG. 15 (b), one or two drops of a phenolphthalein solution 220 are added into the acetic acid solution in the conical flask 210, and a rotator 230 is further added thereto.

Next, as shown in FIG. 15 (c), the conical flask 210 is put on a stirrer 240, which is to be activated to stir the solution with the rotator 230, and a drop of aqueous sodium hydroxide is dropped from the burette 250 into the conical flask 210, while the acetic acid solution therein is being stirred. The pH sensor 260 measures a pH of the solution in the conical flask 210.

A phenolphthalein solution is transparent in an acidic solution, and exhibits a dark red color in an alkaline solution. Accordingly, the stopping of a neutralization reaction can be checked through observation of the color of the solution. The camera 60 takes a video of the solution in the conical flask 210 under the titration process.

Teacher A first generates, through an operation of the key input unit 35 of the teacher terminal 3, a determination condition in which network identification information C, which in turn includes the information regarding the teacher terminal 3 and the information regarding the communication network 2 to be used by teacher A and the students of class B, a time range of a time stamp (2018:XX:##:09:35:00:00 through 2018:XX:##:10:25:59:59) D, and the sensor type information E (pH sensor) are designated, and causes the determination condition database 37 to store the generated determination condition (S1A).

Teacher A informs the graphing scientific calculator 10 of each student of class B of the network identification information C through the communication unit 34 of the teacher terminal 3 through, for example, emails or a messenger application, etc., and causes the network database 27 of the graphing scientific calculator 10 of each student to store the network identification information C. Alternatively, teacher A informs the students of class B of the network identification information C verbally or via writing on a blackboard, etc., and each of the students causes the network database 27 of the graphing scientific calculator 10 to store the network identification information C (S2). Similar to the first embodiment, steps S1A and S2 may be performed either during or after the experiment, as long as the sensor data has not been yet transmitted to the teacher terminal 3. Herein, in a case where a student of class B causes the network database 27 of the graphing scientific calculator 10 to store the network identification information C informed from teacher A, the student may connect the graphing scientific calculator 10 to the communication network 2 informed by teacher A through a manual operation so as to bring the calculator in a state where sensor data, etc. can be transmitted to the teacher terminal 3.

When an experiment actually begins, the data logger 40 is connected to the data acquisition unit 26 of the graphing scientific calculator 10, and the sensor 50 (pH sensor) is connected to the data logger 40 (S3).

When the sensor 50 (pH sensor) is connected to the data logger 40, the data logger 40 recognizes that the connected sensor 50 is a pH sensor, and sensor type information (pH sensor), which is a recognition result, is transmitted to the data acquisition unit 26 (S4).

Furthermore, when a pH of the solution is detected by the sensor 50 (pH sensor), sensor data, which is a detection result, is transmitted to the data acquisition unit 26 from the sensor 50 (pH sensor) via the data logger 40. Furthermore, a user (student) can take a still image or a video during the experiment by operating the camera 60. When the user (student) operates the camera 60 to take a still image or a video during the experiment, image data is generated by the camera 60, and imaging time information is added to the imaging data. When the camera 60 is connected to the data acquisition unit 26, the imaging data to which imaging time information is added can then be output to the data acquisition unit 26 from the camera 60 (S5A).

Upon transmission of the sensor type information (pH sensor) ad sensor data (pH) from the data logger 40, a time stamp is generated in the data acquisition unit 26 (S6A). The generated time stamp is output from the data acquisition unit 26 to the data acquisition program 22a, along with the sensor type information (pH sensor) and the sensor data (pH). The imaging data to which the imaging time information is added is also output to the data acquisition program 22a.

In the data acquisition program 22a, when the sensor type information (pH sensor), the sensor data (pH), and the time stamp are output from the data acquisition unit 26, the network identification information C is obtained from the network database 27 (S7).

In the data acquisition program 22a, once the network identification information C is obtained, the user information is further obtained from the user information storage area 22d, and the obtained network identification information C and the user information are output to the information addition program 22b, along with the sensor type information (pH sensor), the sensor data (pH), the time stamp, and the imaging time information.

In the information addition program 22b, upon receipt of the network identification information C, the sensor type information (pH sensor), the sensor data (pH), the time stamp, and the user information (which are output from the data acquisition program 22a), the sensor type information (pH sensor), the time stamp, the network identification information C, and the user information are added to the sensor data (pH), and the sensor data is output to the communication unit 25. The imaging data to which the imaging time information is added is also output to the communication unit 25 (S8A).

In the communication unit 25, from the network identification information C added to the sensor data (pH) output from the information addition program 22b, a communication network 2 to be used by teacher A and the students of class B (e.g., the Internet or a school intranet), and a teacher terminal 3 of teacher A are known (S9). The sensor data (pH), to which the network identification information C, the sensor type information (pH sensor), the time stamp, and the user information are added, is then transmitted, along with the imaging data to which the imaging time information is added, to the teacher terminal 3 of teacher A, via the known communication network 2 (S10A). In the foregoing step S2, if the graphing scientific calculator 10 is connected to the communication network 2 informed by teacher A through a manual operation of the student of class B and is in a state where sensor data, etc. can be transmitted to the teacher terminal 3, the processing herein of knowing the communication network 2 to be used by teacher A and the students of class B, and the teacher terminal 3 of teacher A is omitted.

In the teacher terminal 3 of teacher A, these information items transmitted from the student terminal 4 of a student of class B via the communication network 2 are received by the communication unit 34. Furthermore, the sensor data (pH) to which the network identification information C, the sensor type information (pH sensor), the time stamp, and the user information are added is output from the communication unit 34 to the determination program 36a, along with the imaging data to which the imaging time information is added.

When the sensor data (pH) is output from the communication unit 34, it is determined in the determination program 36a whether or not the network identification information C, time stamp, and sensor type information (pH sensor) added to the sensor data satisfy the determination condition by referring to the determination condition stored in the determination condition database 37 (S11).

In the determination program 36*a*, when it is determined that the determination condition is satisfied (Yes in S11), the sensor data (pH) is output to the classification program 36*b*, along with the information items added to the sensor data, namely the network identification information C, the time stamp, the sensor type information (pH sensor), and the user information (S13).

If it is determined that the determination condition is not satisfied on the other hand (No in S11), the sensor data is determined not to be appropriate and discarded by the determination program 36*a* (S12).

After step S13, in the classification program 36*b*, each sensor data (pH) output from the determination program 36*a* is classified into groups, such as classes, according to the network identification information C, the acquisition time information, and the sensor type information (pH sensor) E (S14), and the sensor data is stored in the sensor data database 38. The sensor data (pH) classified into the same group is stored in the sensor data database 38, along with the imaging data to which the imaging time information received by the communication unit 34 along with the sensor data (pH) is added (S15A).

Thereafter, courtesy of the display control program 36*c*, the sensor data (pH) acquired in the same class, in other words, the sensor data to which the same classification information is added, is acquired from the sensor data database 38, and a list of graphs generated based on the sensor data (pH) and associated with the user information is displayed on the display 33, as shown as (a-1), (b-1), and (c-1) in FIG. 13 for example. In the present embodiment, the imaging data (a-2), (b-2), and (c-2) received by the communication unit 34 along with the sensor data (pH) and stored in the sensor data database 38 are displayed as a list on the display 33, being associated with the graphs, along with the imaging time information (a-3), (b-3), and (c-3) respectively added to the imaging data (a-2), (b-2), and (c-2) (S16A).

In the example of FIG. 13, three neutralization curves (a-1), (b-1), and (c-1) generated based on the sensor data acquired during the acid-base titration experiment conducted in the same class by three students, namely students α, β, and γ, the user information 33*a*, 33*b*, and 33*c*, imaging data (a-2), (b-2), and (c-2) showing the experiment under the process, and the imaging time information (a-3), (b-3), and (c-3) are displayed. If the imaging data is video data, seek bars (a-4), (b-4), and (c-4) indicating replay positions of the videos are also respectively displayed in the periphery of the imaging time information (a-3), (b-3), and (c-3), for example below the imaging time information (a-3), (b-3), and (c-3) in the present embodiment.

The curve (a-1) shows an example in which a titre of sodium hydroxide was insufficient and the experiment was terminated before a point of neutralization was reached. In this case, the pH changes only to approximately 6, and it can be understood from the video data (a-2) showing the experiment under the process that the color of the solution remains transparent throughout the experiment, even before and after the experiment.

The curve (b-1) shows an example in which a titre of sodium hydroxide (approximately 10 ml) was appropriate, and a point of neutralization was not reached. At a point of neutralization obtained through the titration with a sodium hydroxide solution, the pH rapidly changes from approximately 6 to approximately 12. The curve (b-1) shows this rapid change of pH. From the video data (b-2) showing the experiment under the process, it can be understood that the color of the solution was transparent before the experiment started, but it eventually changed to light red.

The curve (c-1) shows an example in which the solution became alkaline because a drop of sodium hydroxide was continuously added even after the point of neutralization was reached. It can be seen from the curve that a pH increased as a sodium hydroxide solution was further added after a point where a titre of sodium hydroxide (approximately 10 ml) was completed and the pH rapidly rose from approximately 6 to approximately 12, and the solution became more alkaline.

From the video data (c-2) showing the experiment under the process corresponding to the curve (c-1), it can be seen that the color of the solution, which was transparent before the experiment started, changed to light red after an addition of a sodium hydroxide solution (approximately 10 ml), and the red color darkened as the drop of the sodium hydroxide solution continuously was added.

In the video data (a-2), (b-2), and (c-2), an imaging time that indicates a time when the replay should start can be set as appropriate through operating the seek bars (a-4), (b-4), and (c-4), which are displayed around (below, in this example) the video data.

Teacher A comprehensively checks a list of curves of neutralization based on the sensor data (pH) obtained by each of the students of class B, and imaging data, etc. displayed on the display 33 along with the user information, as illustrated in FIG. 13, so as to know which student properly conducted the experiment, and which student did not. Furthermore, teacher A can provide effective classes through, for example, showing, to the students of class B, a list of information displayed on the display 33 as shown in FIG. 13.

On the other hand, the students of class B can also better understand the content of the experiment through looking at the list of information displayed on the display 33 of the teacher terminal 3, as shown in FIG. 13. Particularly, in the present embodiment, not only graphs but also imaging data can be displayed, thereby producing visual effects; thus, each student can more deeply understand content of an experiment with the aid of such visual effects.

An example where the imaging data is video data has been described; however, the present embodiment can be realized even when the imaging data is still image data. In this case, the display of the seek bars (a-4), (b-4), and (c-4) is omitted.

If the imaging data is still image data, still image data corresponding to a single curve of neutralization among the obtained curves is not limited to one data item. For example, if it is important to check the change of color of a solution as in the foregoing acid-base titration experiment described above, it is desirable to obtain and display at least two still images showing the "before and after" of the change of the color of the solution on the display 12 of the teacher terminal 3.

In this case, as illustrated in FIG. 16, the display control program 36*c* knows the chronological order of the still images from the imaging time information added to the still image data, and displays the sets of two still images, (a-2), (b-2), and (c-2), around (below, in this example) the corresponding curves (a-1), (b-1), and (c-1), so that the still images in each set are displayed in the chronological order.

Alternatively, if there are many still images relating to a single curve of neutralization, and it is difficult to display all the images at the same time as shown in FIG. 16, the display control program 36*c* may determine a chronological order of the still images from the imaging time information added to the sill image data, and perform a slide show of the still images in the chronological order around (below in this example) a corresponding curve (a-1), (b-1), or (c-1).

According to the display system 1 of the second embodiment, as described above, not only graphs generated based on sensor data obtained in an experiment but also still or video images relating to the experiment can be displayed on the display 33 of the teacher terminal 3, as illustrated in FIGS. 13 and 16; therefore, not only can a teacher provide a productive class but students can also understand content of the experiment more deeply.

The present invention is not limited to the above-described embodiment and various modifications can be made without departing from the scope of the present invention in practical stages. The above-described embodiments include inventions at various stages, and a variety of inventions can be derived by properly combining structural elements disclosed in connection with the embodiments. For example, even if some of the constituent elements disclosed in the above-described embodiments are deleted, or some of the constituent elements are combined in a different aspect, these variations can be derived as inventions as long as the problem to be solved by the invention can still be solved and the advantageous effects can still be achieved.

The invention claimed is:

1. A data processing apparatus comprising:
a processor configured to:
communicate with a calculator via a plurality of communication networks, the calculator being configured to be connected to a plurality of sensors of different sensor types to obtain sensor data at a plurality of acquisition times, to receive a set of data from the calculator, the set of data associating at least the following:
sensor data obtained by one sensor of the plurality of sensors connected to the calculator;
first specifying information that specifies one communication network of the plurality of communication networks through which the processor communicates with the calculator;
second specifying information that specifies one acquisition time of the plurality of acquisition times at which the sensor data is obtained by the one sensor; and
third specifying information that specifies one sensor type of the plurality of sensor types of the one sensor that obtained the sensor data;
determine, based on the set of data received, whether or not the first specifying information, the second specifying information and the third specifying information included in the set of data received satisfy a predetermined condition, wherein the predetermined condition is that:
the one communication network specified by the first specifying information is a predetermined communication network;
the one acquisition time specified by the second specifying information is within a predetermined time range; and
the one sensor type specified by the third specifying information is a predetermined sensor type;
classify the set of data determined to satisfy the predetermined condition into one group of a plurality of groups as classification information;
append at least the classification information to the sensor data and store into memory;
generate and output an output file for the sensor data with the same classification information; and
control one or more displays to display information based on the output file for the sensor data with the same classification information.

2. The data processing apparatus according to claim 1, wherein the processor is configured to set the predetermined communication network, the predetermined time range and the predetermined sensor type based on user selection.

3. The data processing apparatus according to claim 1, wherein the sensor data includes imaging data obtained by the at least one sensor,
wherein the acquisition time is an imaging time at which the imaging data is obtained by the at least one sensor, and
wherein the output file is generated based on the imaging data and the imaging time.

4. A data processing method performed by a processor of a data processing apparatus, the data processing method comprising:
communicating with a calculator via a plurality of communication networks, the calculator being configured to be connected to a plurality of sensors of different sensor types to obtain sensor data at a plurality of acquisition times, to receive a set of data from the calculator, the set of data associating at least the following:
sensor data obtained by one sensor of the plurality of sensors connected to the calculator;
first specifying information that specifies one communication network of the plurality of communication networks through which the processor communicates with the calculator;
second specifying information that specifies one acquisition time of the plurality of acquisition times at which the sensor data is obtained by the one sensor; and
third specifying information that specifies one sensor type of the plurality of sensor types of the one sensor that obtained the sensor data;
determining, based on the set of data received, that the first specifying information, the second specifying information and the third specifying information included in the set of data received satisfy a predetermined condition, wherein the predetermined condition is that:
the one communication network specified by the first specifying information is a predetermined communication network;
the one acquisition time specified by the second specifying information is within a predetermined time range; and
the one sensor type specified by the third specifying information is a predetermined sensor type;
classifying the set of data determined to satisfy the predetermined condition into one group of a plurality of groups as classification information;
appending at least the classification information to the sensor data and storing into memory;
generating and outputting an output file for the sensor data with the same classification information; and
controlling one or more displays to display information based on the output file for the sensor data with the same classification information.

5. A non-transitory computer-readable recording medium with an executable program stored thereon, wherein the executable program instructs a controller of a data processing apparatus to perform:

communicating with a calculator via a plurality of communication networks, the calculator being configured to be connected to a plurality of sensors of different sensor types to obtain sensor data at a plurality of acquisition times, to receive a set of data from the calculator, the set of data associating at least the following:

sensor data obtained by one sensor of the plurality of sensors connected to the calculator;

first specifying information that specifies one communication network of the plurality of communication networks through which the processor communicates with the calculator;

second specifying information that specifies one acquisition time of the plurality of acquisition times at which the sensor data is obtained by the one sensor; and third specifying information that specifies one sensor type of the plurality of sensor types of the one sensor that obtained the sensor data;

determining, based on the set of data received, whether or not the first specifying information, the second specifying information and the third specifying information included in the set of data received satisfy a predetermined condition, wherein the predetermined condition is that:

the one communication network specified by the first specifying information is a predetermined communication network;

the one acquisition time specified by the second specifying information is within a predetermined time range; and the one sensor type specified by the third specifying information is a predetermined sensor type;

classifying the set of data determined to satisfy the predetermined condition into one group of a plurality of groups as classification information;

appending at least the classification information to the sensor data and storing into memory;

generating and outputting an output file for the sensor data with the same classification information; and controlling one or more displays to display information based on the output file for the sensor data with the same classification information.

6. A method performed by a data processing system that includes a data processing apparatus and a calculator, the method comprising:

transmitting, from the calculator, a set of data to the data processing system via a plurality of communication networks, the calculator being configured to be connected to a plurality of sensors of different sensor types of obtain sensor data at a plurality of acquisition times, the set of data associating at least the following:

sensor data obtained by one sensor of a plurality of sensors connected to the calculator;

first specifying information that specifies one communication network of the plurality of communication networks through which the data processing apparatus communicates with the calculator;

second specifying information that specifies one acquisition time of the plurality of acquisition times at which the sensor data is obtained by the one sensor; and third specifying information that specifies one sensor type of the plurality of sensor types of the one sensor that obtained the sensor data;

receiving, by the data processing apparatus, the set of data transmitted from the calculator;

determining, by the data processing apparatus, based on the set of data received, that the first specifying information, the second specifying information and the third specifying information included in the set of data received by the data processing apparatus satisfy a predetermined condition, wherein the predetermined condition is that:

the one communication network specified by the first specifying information is a predetermined communication network;

the one acquisition time specified by the second specifying information is within a predetermined time range; and the one sensor type specified by the third specifying information is a predetermined sensor type;

classifying, by the data processing apparatus, the set of data determined to satisfy the predetermined condition into one group of a plurality of groups as classification information;

appending at least the classification information to the sensor data and storing into memory;

generating and outputting, by the data processing apparatus, an output file for the sensor data with the same classification information; and controlling one or more displays to display information based on the output file for the sensor data with the same classification information.

7. The method according to claim 6, further comprising:

storing, by the calculator, the first specifying information in association with the second specifying information and the third specifying information.

8. The method according to claim 6, wherein the first specifying information further specifies identification information of the data processing apparatus.

9. The method according to claim 6, further comprising:

selecting, by the calculator, the first specifying information from a stored plurality of first specifying information, the first specifying information being associated with the second specifying information and the third specifying information; and transmitting, from the calculator, the set of data associating at least the sensor data, the first specifying information selected, the second specifying information and the third specifying information.

10. The data processing apparatus according to claim 1, wherein the first specifying information further specifies identification information of the data processing apparatus.

11. The data processing apparatus according to claim 1, wherein the processor is configured to access a database storing the predetermined condition in which the one group is associated with the predetermined communication network, the predetermined time range and the predetermined sensor type.

12. The data processing apparatus according to claim 11, wherein the processor is configured to determine whether or not the first specifying information, the second specifying information and the third specifying information included in the set of data received satisfy the predetermined condition and to classify the set of data determined to satisfy the predetermined condition into the one group of the plurality of groups based on the predetermined condition stored in the database.

* * * * *